United States Patent
Ohno et al.

(10) Patent No.: US 10,542,307 B2
(45) Date of Patent: Jan. 21, 2020

(54) CONTENT TRANSMISSION DEVICE AND CONTENT TRANSMISSION METHOD

(71) Applicant: MAXELL, LTD., Kyoyo (JP)

(72) Inventors: Chiyo Ohno, Tokyo (JP); Hiroo Okamoto, Tokyo (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 15/202,280

(22) Filed: Jul. 5, 2016

(65) Prior Publication Data

US 2016/0316239 A1 Oct. 27, 2016

Related U.S. Application Data

(62) Division of application No. 14/127,180, filed as application No. PCT/JP2012/063680 on May 28, 2012.

(30) Foreign Application Priority Data

Jul. 1, 2011 (JP) .................................. 2011-146952

(51) Int. Cl.
*H04N 21/254* (2011.01)
*H04N 21/4627* (2011.01)
(Continued)

(52) U.S. Cl.
CPC ....... *H04N 21/2541* (2013.01); *H04L 9/0822* (2013.01); *H04L 9/0891* (2013.01);
(Continued)

(58) Field of Classification Search
CPC ......... H04N 21/2541; H04N 21/42623; H04N 21/442; H04N 21/2347; H04N 21/6125;
(Continued)

(56) References Cited

U.S. PATENT DOCUMENTS

2002/0180581 A1 12/2002 Kamiwada et al.
2004/0237100 A1 11/2004 Pinder et al.
(Continued)

FOREIGN PATENT DOCUMENTS

JP 2005-269288 A 9/2005
JP 2005-275828 A 10/2005
(Continued)

OTHER PUBLICATIONS

Office Action, dated Aug. 18, 2015, which issued during the prosecution of Japanese Patent Application No. 2011-146952, which corresponds to the present application.

*Primary Examiner* — Benjamin R Bruckart
*Assistant Examiner* — Aklil M Tesfaye
(74) *Attorney, Agent, or Firm* — Mattingly & Malur, PC

(57) ABSTRACT

A content transmission device for transmitting a digital content to other device connected via a network, including a receiving unit that receives the digital content accompanied with a piece of copy control information indicating a condition of restricting the digital content from being copied, a communication processing unit that transmits and receives the digital content or control commands to and from the other device, a connection determining unit that determines whether the other device is present on an intra-residential network connected by the content transmission device, and a control unit that controls the receiving unit, the communication processing unit, and the connection determining unit, in which the control unit does not output the digital content received by the receiving unit from the communication processing unit to the other device in a case where the other device is determined not to be installed at an inside of a residence.

6 Claims, 29 Drawing Sheets

(51) Int. Cl.
*H04L 9/08* (2006.01)
*H04N 21/435* (2011.01)
*H04L 29/12* (2006.01)
*H04L 29/06* (2006.01)
*H04L 29/08* (2006.01)
*H04N 21/2347* (2011.01)
*H04N 21/426* (2011.01)
*H04N 21/442* (2011.01)
*H04N 21/61* (2011.01)

(52) U.S. Cl.
CPC ........ *H04L 61/2007* (2013.01); *H04L 65/607* (2013.01); *H04L 65/608* (2013.01); *H04L 67/02* (2013.01); *H04N 21/2347* (2013.01); *H04N 21/42623* (2013.01); *H04N 21/435* (2013.01); *H04N 21/442* (2013.01); *H04N 21/4627* (2013.01); *H04N 21/6125* (2013.01); *H04L 2209/60* (2013.01)

(58) Field of Classification Search
CPC .......... H04N 21/25816; H04N 7/1675; H04N 21/435; H04N 21/4524; H04N 21/4627; H04L 61/2007; H04L 67/02; H04L 65/607; H04L 65/608; H04L 9/0822; H04L 9/3271; H04L 2209/80; H04L 2209/60; H04L 9/0891
See application file for complete search history.

(56) References Cited

U.S. PATENT DOCUMENTS

| | | |
|---|---|---|
| 2005/0228858 A1 | 10/2005 | Mizutani et al. |
| 2005/0240974 A1 | 10/2005 | Hiramoto et al. |
| 2006/0127037 A1 | 6/2006 | Van Hoff et al. |
| 2007/0022195 A1 | 1/2007 | Kawano et al. |
| 2008/0022061 A1 | 1/2008 | Ito et al. |
| 2008/0092157 A1* | 4/2008 | Walter ............... H04N 7/17354 725/25 |
| 2009/0013346 A1 | 1/2009 | Han |
| 2009/0144765 A1* | 6/2009 | Branam ............ H04N 7/17318 725/1 |
| 2009/0193461 A1 | 7/2009 | Yuki et al. |
| 2010/0077488 A1* | 3/2010 | Fujiwara ................. G06F 21/10 726/30 |
| 2010/0095356 A1* | 4/2010 | Han .......................... H04L 9/12 726/4 |
| 2010/0223660 A1* | 9/2010 | Scott ................. H04N 21/2541 726/4 |
| 2010/0293570 A1 | 11/2010 | Teraoka et al. |
| 2011/0022842 A1 | 1/2011 | Ono et al. |
| 2011/0142422 A1* | 6/2011 | Friedman ............... H04N 5/765 386/297 |
| 2011/0191859 A1* | 8/2011 | Naslund .................. G06F 21/10 726/27 |
| 2012/0128333 A1* | 5/2012 | Miyake .................. H04N 5/913 386/259 |
| 2012/0159575 A1 | 6/2012 | Fukui et al. |

FOREIGN PATENT DOCUMENTS

| | | |
|---|---|---|
| JP | 2007-36351 A | 2/2007 |
| JP | 2008-118410 A | 5/2008 |
| JP | 2011-9977 A | 1/2011 |
| JP | 2011-61478 A | 3/2011 |

\* cited by examiner

FIG. 3 CONFIGURATION DIAGRAM OF PORTABLE TERMINAL 200

CONFIGURATION DIAGRAM OF DEVICE INFORMATION MANAGEMENT UNIT 109

FIG. 5

CONFIGURATION EXAMPLE OF DEVICE INFORMATION ~ 5000

DEFINITION TABLE ~ 5100

| | | |
|---|---|---|
| AUTHENTICATION DEVICE MAXIMUM NUMBER | 34 | 5101 |
| EXTRA-RESIDENTIAL REGISTRATION MAXIMUM NUMBER | 20 | 5102 |
| INTRA-RESIDENTIAL COUNTER MAXIMUM VALUE | 120 | 5103 |
| EXTRA-RESIDENTIAL COUNTER MAXIMUM VALUE | 60 | 5104 |
| SIMULTANEOUS ACCESS MAXIMUM NUMBER | 7 | 5105 |
| EXTRA-RESIDENTIAL SIMULTANEOUS ACCESS MAXIMUM NUMBER | 1 | 5106 |

INTRA-RESIDENTIAL DEVICE INFORMATION TABLE ~ 5200

| | | |
|---|---|---|
| INTRA-RESIDENTIAL EXCHANGE KEY | #S&%"! | 5220 |
| AUTHENTICATION DEVICE NUMBER | 3 | 5221 |
| SIMULTANEOUS ACCESS NUMBER | 2 | 5222 |

| ID (5201) | DEVICE ID (5202) | ADDRESS INFORMATION (5203) | COUNTER VALUE (5204) | STATUS (5205) | EXCHANGE KEY FOR MOVE (5206) | |
|---|---|---|---|---|---|---|
| 1 | CONTENT RECEPTION DEVICE 300 | AAAAA | 75 | ACCESSING | — | 5211 |
| 2 | PORTABLE TERMINAL 200 | BBBBB | 120 | STOP | — | 5212 |
| 3 | CONTENT RECEPTION DEVICE 400 | CCCCC | 40 | ACCESSING | — | 5213 |
| .. | ... | ... | ... | ... | ... | |

EXTRA-RESIDENTIAL DEVICE INFORMATION TABLE ~ 5300

| | | |
|---|---|---|
| EXTRA-RESIDENTIAL REGISTRATION NUMBER | 2 | 5321 |
| EXTRA-RESIDENTIAL SIMULTANEOUS ACCESS NUMBER | 1 | 5321 |

| ID (5301) | DEVICE ID (5302) | ADDRESS INFORMATION (5303) | EXTRA-RESIDENTIAL EXCHANGE KEY (5304) | STATUS (5305) | EXTRA-RESIDENTIAL COUNTER VALUE (5306) | |
|---|---|---|---|---|---|---|
| 1 | PORTABLE TERMINAL 200 | DDDDD | @#*S%+! | ACCESSING | 75 | 5311 |
| 2 | CONTENT RECEPTION DEVICE 400 | EEEEE | *$$+@@& | STOP | 120 | 5312 |
| .. | ... | ... | ... | ... | ... | |

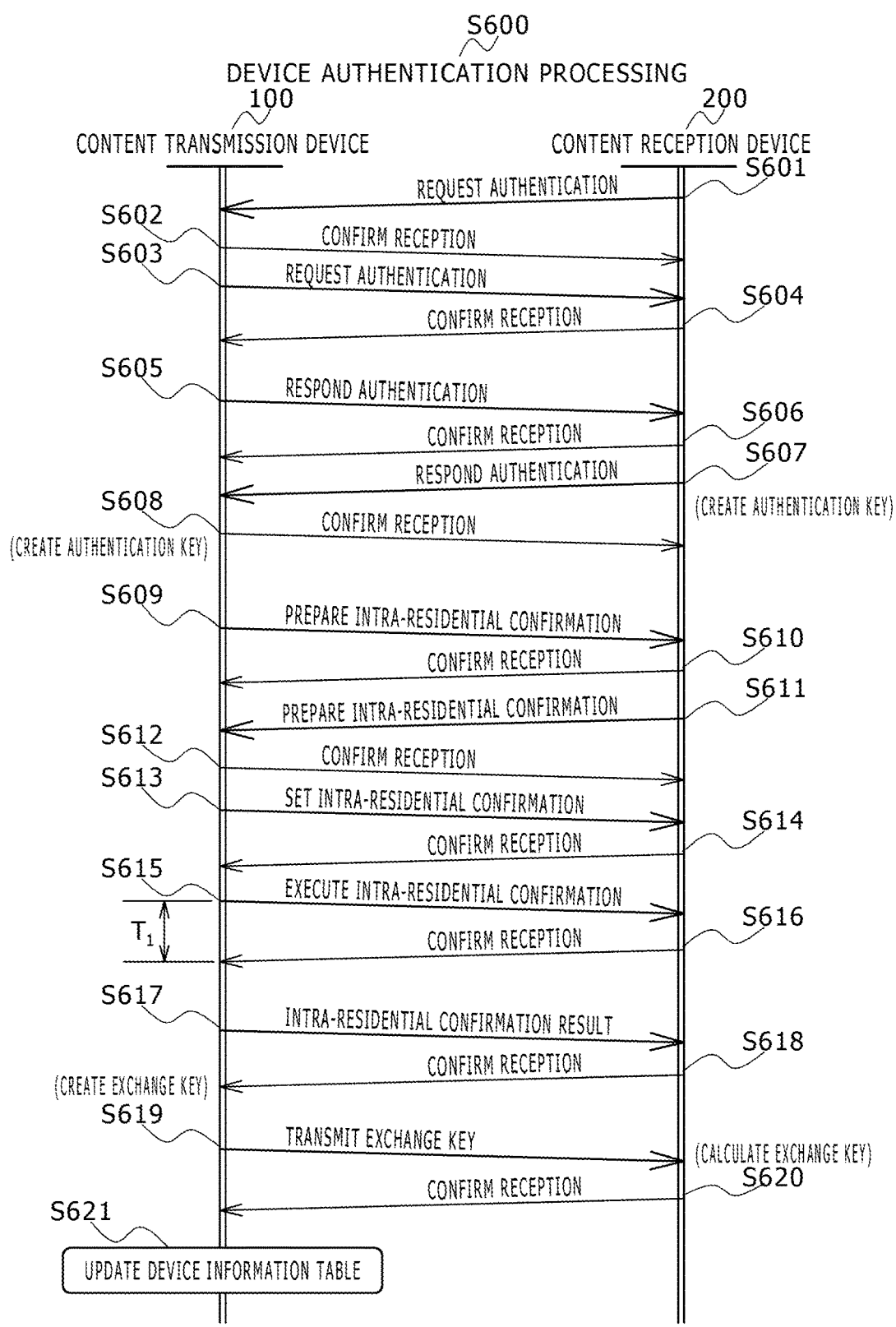

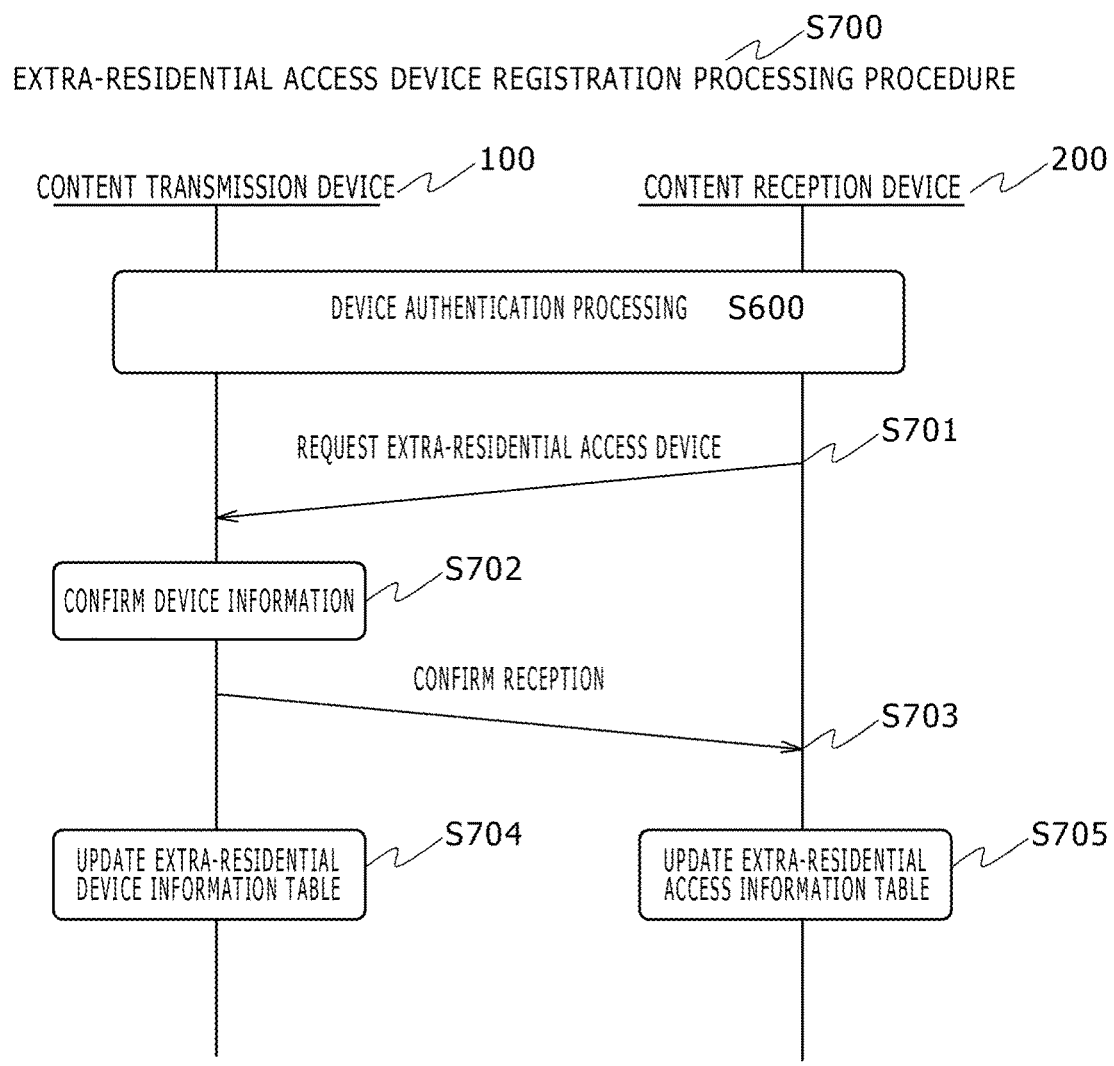

FIG.8

EXTRA-RESIDENTIAL ACCESS INFORMATION TABLE ⟋60000

| ID | ADDRESS INFORMATION ⟋60001 | | REGISTRATION INFORMATION ⟋60003 | | EXTRA-RESIDENTIAL EXCHANGE KEY ⟋60004 |
|---|---|---|---|---|---|
| | MAC | IP ⟋60002 | USER NAME | PASSWORD | |
| 1 | DDDDDD | 133.144.xxx.yyy | taro | ********** | *+2$%&6 |
| 2 | CCCCCC | 133.144.aaa.yyy | hanako | ********** | %&$#9A |
| 3 | AAAAAA | 133.144.xxx.bbb | kazuo | ********** | @@&%12 |
| ... | | | | | |

FIG.10
EXAMPLE OF SCREEN OF CONTENT RECEPTION DEVICE
IN DEVICE REGISTRATION PROCESSING
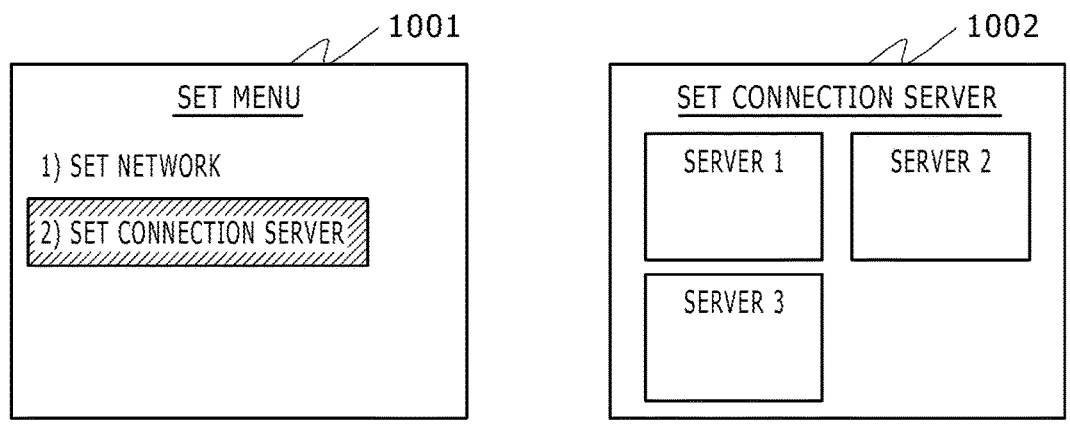
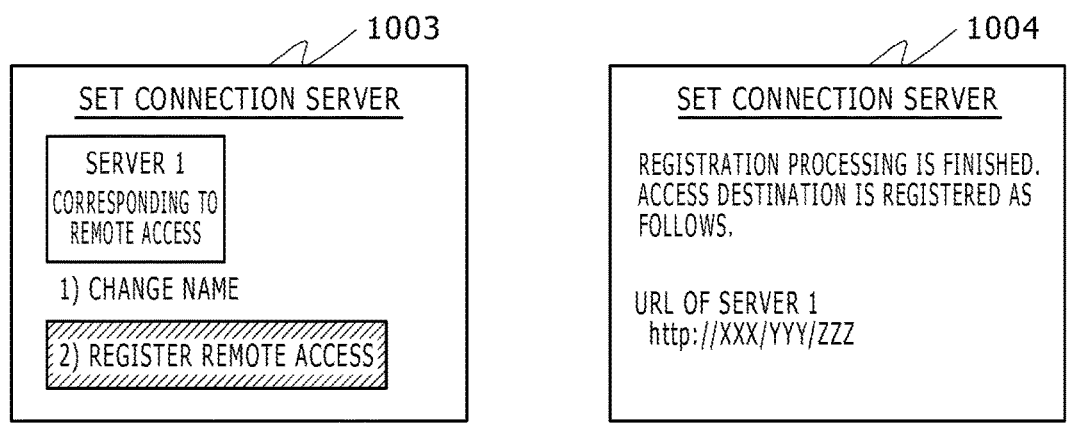

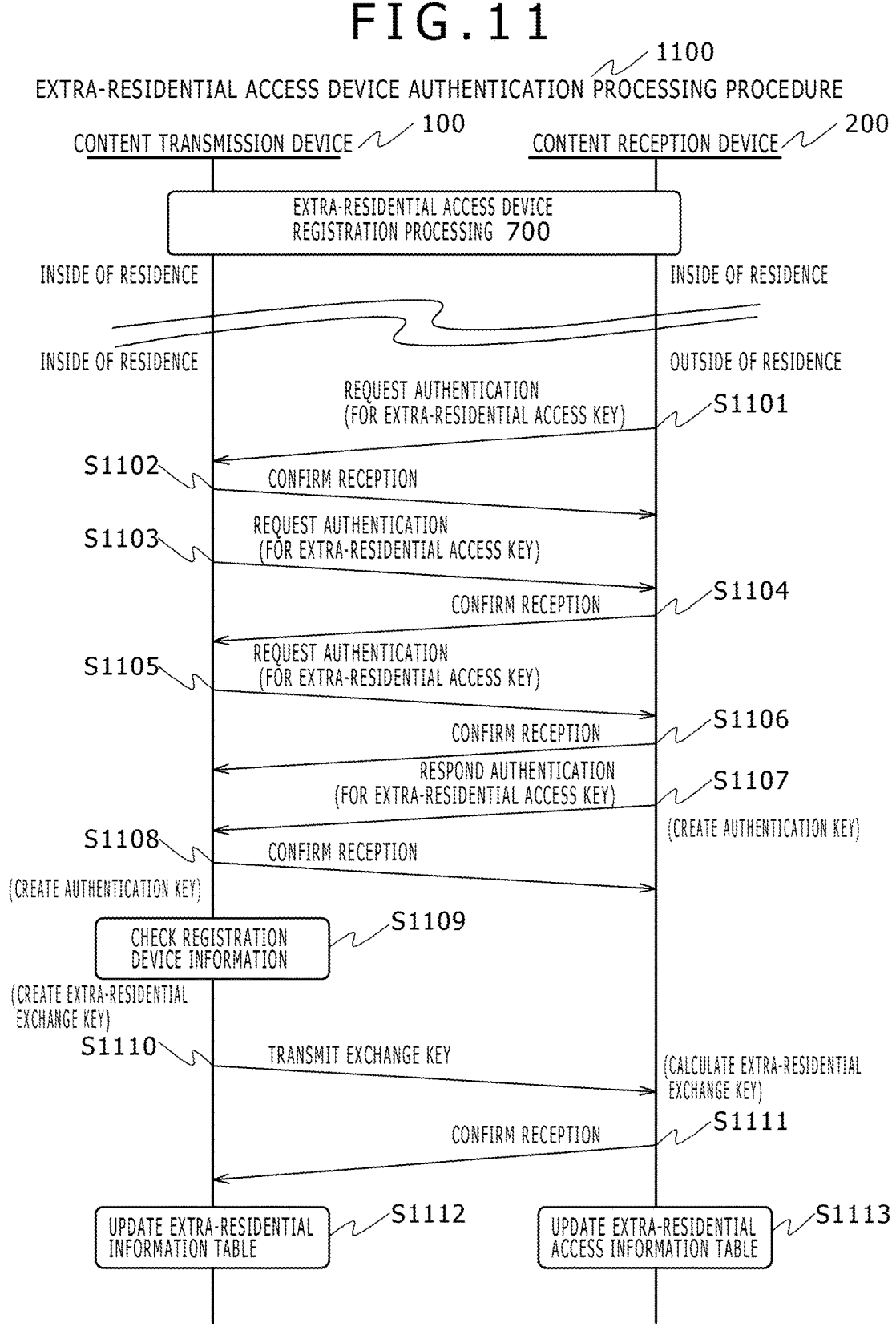

FIG.12

CONFIGURATION EXAMPLE OF CONTENT USING DESCRIPTOR

/1200

| NAME | CONTENT | |
|---|---|---|
| COPY RESTRICTION MODE (copy_restriction_mode) | INDICATE COPY NUMBER RESTRICTION MODE. SET BY OPERATION RULE OF ENTERPRISE.<br>1: OPERATE NUMBER RESTRICTION COPY (DEFAULT)<br>0: NUMBER RESTRICTION COPY IS NOT OPERATED. | 1201 |
| RESOLUTION RESTRICTION BIT (image_constraint_token) | INDICATE RESOLUTION RESTRICTION OF IMAGE SIGNAL OUTPUT.<br>1: NOT RESTRICT RESOLUTION (DEFAULT)<br>0: RESTRICT RESOLUTION | 1202 |
| RETENTION CONTROL BIT (retention_mode) | INDICATE PRESENCE/ABSENCE OF RETENTION.<br>1: RETENTION IMPOSSIBLE<br>0: RETENTION POSSIBLE (DEFAULT) | 1203 |
| RETENTION ACCEPTABLE TIME (retention_state) | INDICATE ACCEPTABLE TIME OF RETENTION.<br>1 HOUR 30 MINUTES (DEFAULT), 3 HOURS, ..., NO RESTRICTION | 1204 |
| OUTPUT PROTECTION BIT (encryption_mode) | INDICATE PRESENCE/ABSENCE OF OUTPUT PROTECTION IN OUTPUTTING CONTENT OF "COPIABLE WITHOUT RESTRICTION" FROM DIGITAL INTERFACE.<br>1: OUTPUT PROTECTION NOT PRESENT (DEFAULT)<br>0: OUTPUT PROTECTION PRESENT | 1205 |
| REMOTE ACCESS RESTRICTION MODE (remote_access_restriction_mode) | INDICATE MODE OF REMOTE ACCESS RESTRICTION.<br>SET BY OPERATION RULE OF ENTERPRISE.<br>1: REMOTE ACCESS NOT RESTRICTED (DEFAULT)<br>0: RESTRICT REMOTE ACCESS | 1206 |

FIG.13

CONFIGURATION EXAMPLE OF DIGITAL COPY CONTENT DESCRIPTOR

1300

| NAME | CONTENT | |
|---|---|---|
| DIGITAL COPY CONTROL INFORMATION (digital_recording_control_data) | INDICATE INFORMATION CONTROLLING COPY GENERATION.<br>00: COPIABLE WITHOUT RESTRICTION CONDITION<br>01: NOT USED (OR PROHIBIT COPY)<br>10: COPIABLE ONLY FOR ONE GENERATION<br>11: PROHIBIT COPY | 1301 |
| COPY CONTROL TYPE INFORMATION (copy_control_type) | INDICATE INFORMATION OF TYPE OF CONTROLLING COPY GENERATION.<br>01: EXECUTE DTCP PROTECTION TO OUTPUT FROM OUTPUT DIGITAL INPUT/OUTPUT TERMINAL<br>11: NOT EXECUTE DTCP PROTECTION TO OUTPUT FROM DIGITAL INPUT/OUTPUT TERMINAL | 1302 |
| ANALOG OUTPUT COPY CONTROL INFORMATION (APS_control_data) | INDICATE INFORMATION CONTROLLING COPY OF ANALOG OUTPUT IN CASE WHERE COPY CONTROL TYPE INFORMATION IS "01" OR "11".<br>00: COPIABLE WITHOUT RESTRICTION CONDITION<br>OTHER THAN 00: RESTRICTION CONDITION PRESENT | 1303 |

FIG.14

DIGITAL CONTENT OUTPUT CONTROL TABLE

1400

| DIGITAL COPY CONTROL DESCRIPTOR | | CONTENT USING DESCRIPTOR | | POSSIBLE/IMPOSSIBLE, PRESENCE/ABSENCE OF ENCRYPTION, DECRYPTION MODE (E-EMI) OF OUTPUT OF DIGITAL CONTENT FROM DIGITAL INPUT/OUTPUT TERMINAL | |
|---|---|---|---|---|---|
| COPY CONTROL TYPE INFORMATION (copy_control_type) | DIGITAL COPY CONTROL INFORMATION (digital_recording_control_data) | OUTPUT PROTECTION BIT (encryption_mode) | REMOTE ACCESS RESTRICTION MODE (remote_access_restriction_mode) | | |
| 01 | 00 | 1 | —*2 | OUTPUTTABLE, ENCRYPTION NOT PRESENT | 1401 |
| | | 0 | 1 | OUTPUTTABLE, ENCRYPTION PRESENT Copy free with EPN | 1402 |
| | | | 0 | OUTPUTTABLE, ENCRYPTION PRESENT No more copies | 1403 |
| | 01*1 | —*2 | —*2 | OUTPUTTABLE ENCRYPTION PRESENT No more copies | 1404 |
| | 10 | —*2 | 1 | OUTPUTTABLE, ENCRYPTION PRESENT Copy one generation | 1405 |
| | | | 0 | OUTPUTTABLE, ENCRYPTION PRESENT No more copies | 1406 |
| | 11 | —*2 | —*2 | OUTPUTTABLE, ENCRYPTION PRESENT Copy never | 1407 |
| 11 | 00 | —*2 | —*2 | OUPUTTABLE, ENCRYPTION NOT PRESENT | 1408 |
| | 01*1 | —*2 | —*2 | NOT OUTPUTTABLE | 1409 |
| | 10 | —*2 | —*2 | NOT OUTPUTTABLE | 1410 |
| | 11 | —*2 | —*2 | NOT OUTPUTTABLE | 1411 |
| OTHER THAN 01/11*1 | —*2 | —*2 | —*2 | NOT OUTPUTTABLE | 1412 |

1302　1301　1205　1206

*1 ORDINARILY NOT OPERATED COMBINATION
*2 MEANING Don't care

FIG.19

THRESHOLD INFORMATION 1900

TTL TABLE 1910

| INTRA-RESIDENTIAL RESTRICTION TTL VALUE | 3 | 1911 |
| EXTRA-RESIDENTIAL TRANSMISSION TTL SET VALUE | 128 | 1912 |

INTRA-RESIDENTIAL CONFIRMATION THRESHOLD TABLE 1920

| INTRA-RESIDENTIAL CONFIRMATION TIME OUT VALUE (T) | 7 | 1921 |
| INTRA-RESIDENTIAL CONFIRMATION TIME OUT VALUE FOR EXTRA-RESIDENTIAL REGISTRATION (T') | 4 | 1922 |

FIG.20
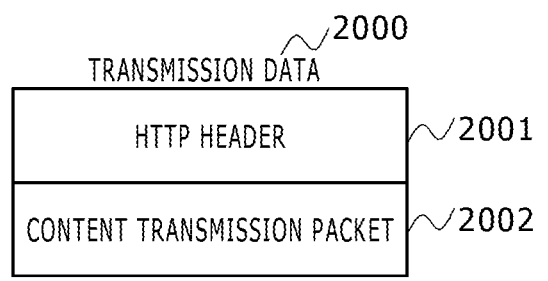
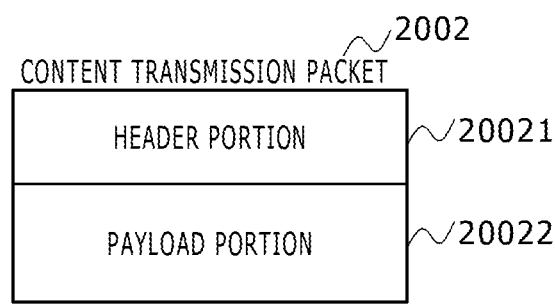
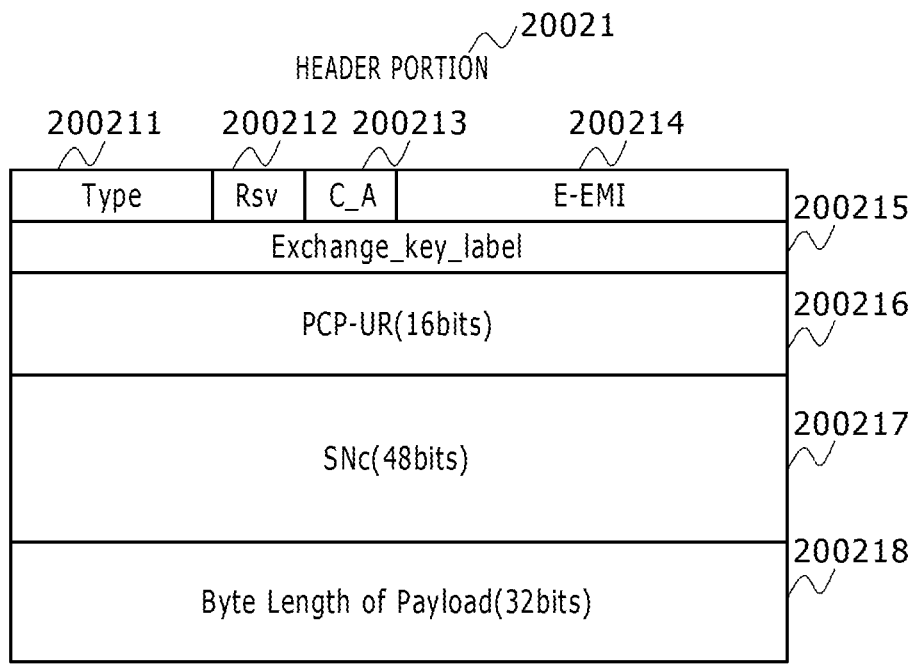
Rsv :Reserved(0)

FIG.21

PACKET MONITORING TABLE 2100

| ID | PORT NUMBER | TTL RESTRICTION |
|----|-------------|-----------------|
| 1  | 53219       | 3               |
| 2  | 53220       | 0               |
| 3  | 33432       | 128             |
| ... | ...        | ...             |

FIG.23

CONNECTION MANAGEMENT TABLE 2300

| ID | SOCKET DESCRIPTOR | TTL RESTRICTION |
|---|---|---|
| 1 | 2 | 3 |
| 2 | 4 | 0 |
| 3 | 6 | NOT SET YET |
| ... | ... | ... |

FIG.25

DIGITAL CONTENT RECORDING CONTROL TABLE

2500

| DIGITAL COPY CONTROL DESCRIPTOR | | CONTENT USING DESCRIPTOR | | RECORDING CONTROL OF DIGITAL CONTENT |
|---|---|---|---|---|
| COPY CONTROL TYPE INFORMATION (copy_control_type) | DIGITAL COPY CONTROL INFORMATION (digital_recording_control_data) | OUTPUT PROTECTION BIT (encryption_mode) | REMOTE ACCESS RESTRICTION MODE (remote_access_restriction_mode) | |
| 01 | 00 | 1 | — | COPIABLE — 2501 |
| | | 0 | — | COPIABLE (ENCRYPTED AND RECORDED) — 2502 |
| | 01 | — | — | PROHIBIT COPY — 2503 |
| | 10 | — | 1 | COPIABLE WITH NUMBER RESTRICTION IN CASE OF COPY NUMBER RESTRICTION MODE = 1 (ENCRYPTED AND RECORDED) — 2504 |
| | | | | COPIABLE ONLY FOR ONE GENERATION IN CASE OF COPY NUMBER RESTRICTION MODE = 0 (ENCRYPTED AND RECORDED, REWRITE DIGITAL COPY CONTROL INFORMATION TO 01 AND RECORD) — 2505 |
| | | — | 0 | COPIABLE ONLY FOR ONE GENERATION (ENCRYPTED AND RECORDED, REWRITE DIGITAL COPY CONTROL INFORMATION TO 01 AND RECORD) — 2506 |
| | 11 | — | — | PROHIBIT COPY — 2507 |
| 11 | 00 | — | — | COPIABLE — 2508 |
| | OTHER THAN 00 | — | — | PROHIBIT COPY — 2509 |
| OTHER THAN 01/11 | — | — | — | PROHIBIT COPY — 2510 |
| 1302 | 1301 | 1205 | 1206 | |

—: MEANING Don't care

SYSTEM CONFIGURATION EXAMPLE

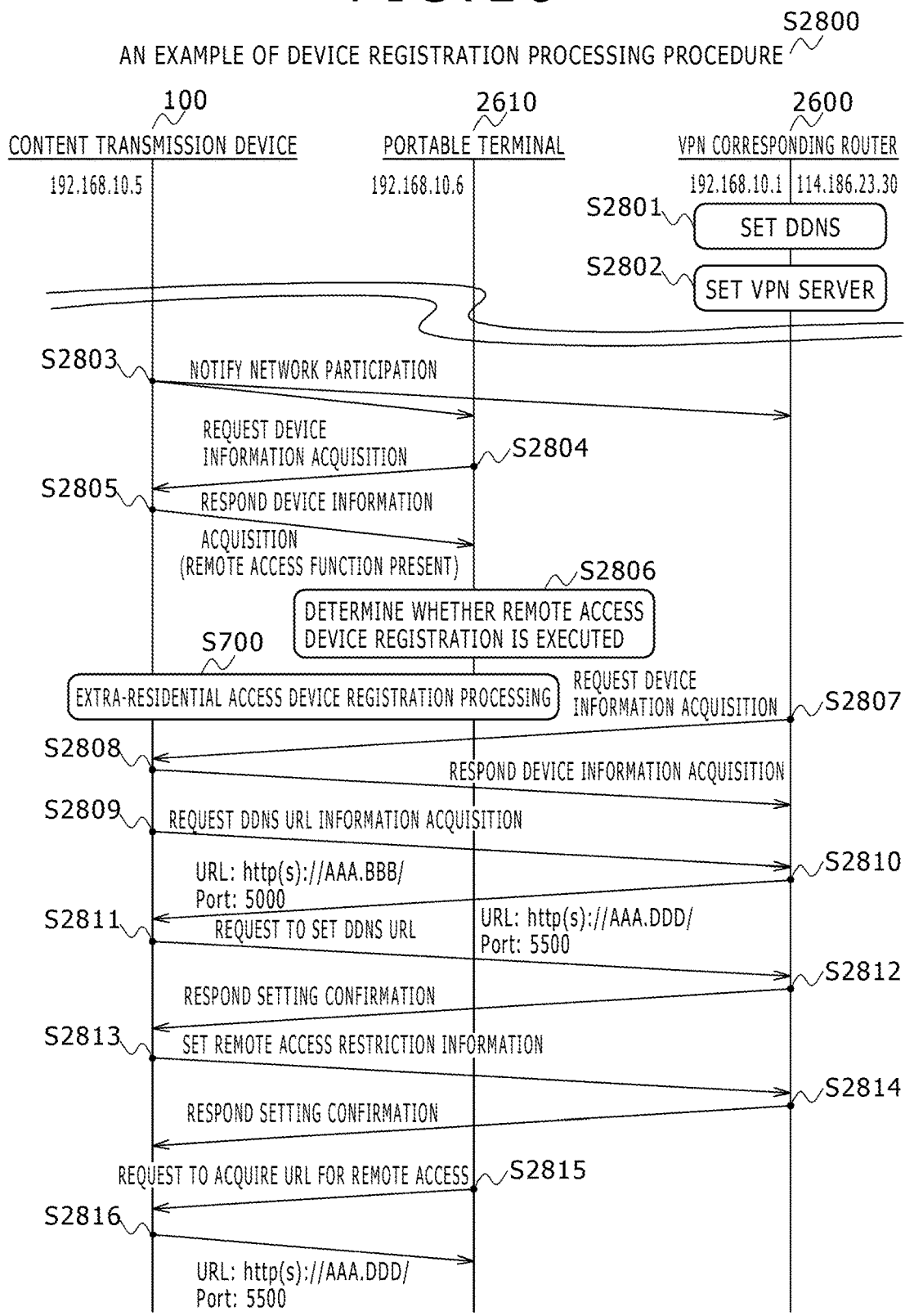

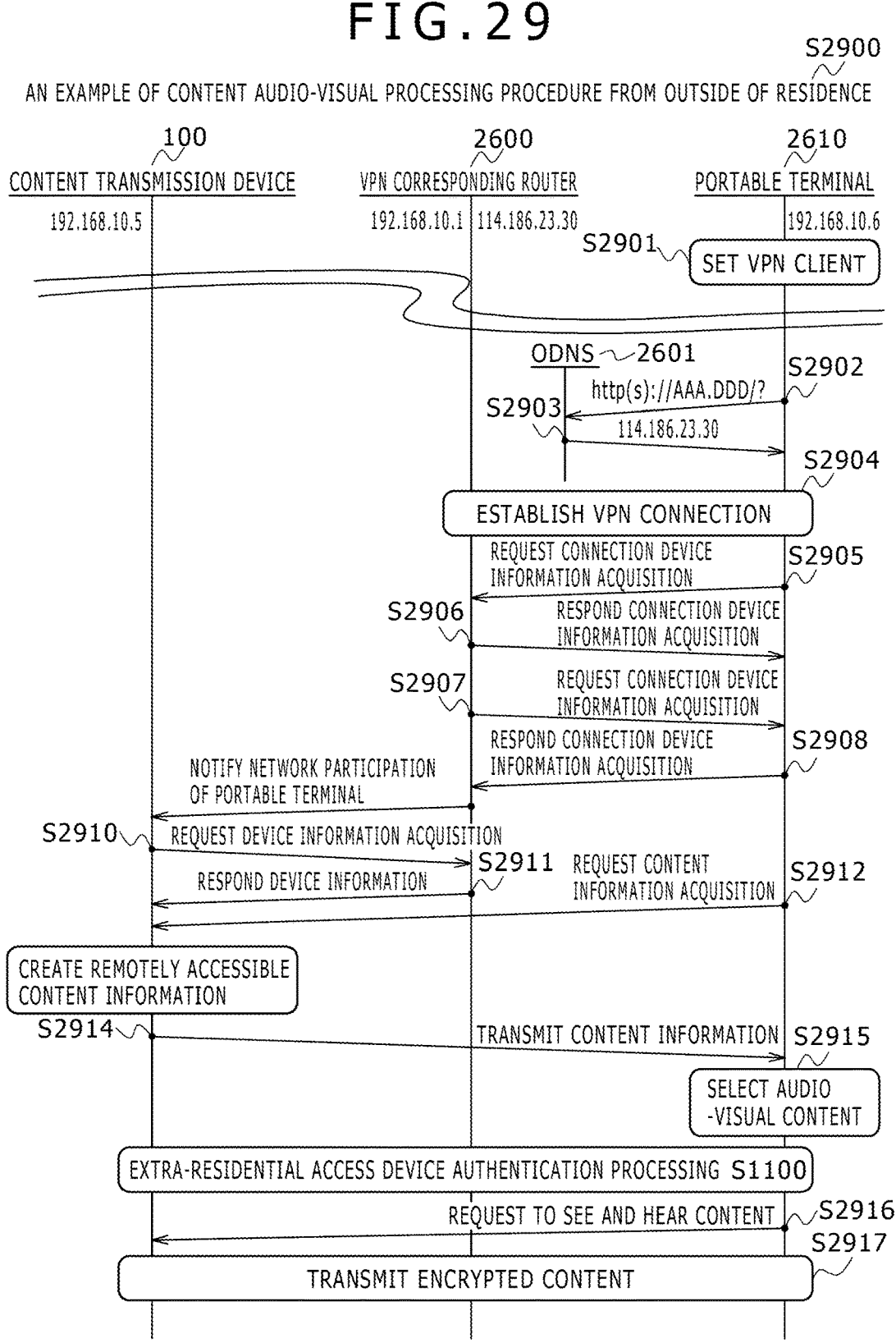

CONTENT TRANSMISSION DEVICE AND CONTENT TRANSMISSION METHOD

CROSS REFERENCE TO PRIOR APPLICATIONS

This application is a divisional application of U.S. patent application Ser. No. 14/127,180, filed on Dec. 18, 2013, which is a U.S. National Phase application under 35 U.S.C. § 371 of International Application No. PCT/JP2012/063680, filed on May 28, 2012, and claims benefit of priority to Japanese Patent Application No. 2011-146952, filed on Jul. 1, 2011. The contents of the above applications are hereby incorporated by reference.

TECHNICAL FIELD

The present invention relates to a content transmission device and a content transmission method preferable for protecting a copyright of transmitted contents in transmitting and receiving contents of image, voices, and the like via a network.

BACKGROUND ART

When contents are transmitted between digital AV apparatus, encryption is executed on a content transmission device side, and information for decryption is shared between the content transmission device side and a content reception device side. Thereby, copy protect preventing creation of copy without restrictions is executed such that the contents are correctly received and not decrypted by a device other than the content reception device which is a transmission destination.

There is a system described in, for example, Patent Literature 1 which is adopted in digital AV apparatus as an example of a method of such copy protect. According to the system described in Patent Literature 1, contents are classified into "Copy free (copiable without restrictions)", "Copy free with EPN asserted (copiable without restrictions with output protection)", "Copy one generation (copiable for one generation)", "No more copies (prohibit recopy)", and "Copy never (prohibit copy)" to manage the contents. In a picture recording device, only contents of "Copy free", "Copy free with EPN asserted", and "Copy one generation" are recorded, contents of "Copy one generation" are treated as "No more copies" after once recorded, and transmission is executed by subjecting the contents to an encryption processing on a transmission side except contents of "Copy free". Thereby, copying of contents without restrictions is prevented.

Patent Literature 1 and Patent Literature 2 disclose a technology for determining an intra-residential network such that contents configuring a copyright protection object of broadcasting programs recorded in a household are not delivered extra-residentially without restrictions in contents transmission in a wired or wireless network.

CITATION LIST

Patent Literatures

Patent Literature 1: Japanese Unexamined Patent Application Publication No. 2005-269288
Patent Literature 2: Japanese Unexamined Patent Application Publication No. 2007-36351

SUMMARY OF INVENTION

Technical Problem

For a user who owns apparatus used in a mobile environment such as a notebook PC or a portable terminal, the user has a high demand of intending to access to contents in a household from a travel destination or an inside of a train in the midst of commutation or the like by using the apparatus. On the other hand, according to the background arts described above, a function of confirming that a transmission side and a reception side apparatus are present in the same household when contents of a copyright protection object are transmitted via a wired or a wireless network. Consequently, an access cannot be executed to contents of a copyright protection object from a going out destination.

Solution to Problem

Configurations described in, for example, claims are adopted for resolving the problem. Although the present application includes plural means for resolving the problem, an example thereof is pointed out as follows. There is provided a content transmission device for transmitting digital contents to other device connected via a network, including a reception unit that receives digital contents accompanied with copy control information indicating conditions of restricting copy of the digital contents, a communication processing unit that transmits and receives the digital contents, various data, and control commands to and from the other device, a connection determination unit that determines whether the other device is present on an intra-residential network to which the content transmission device is connected, and a control unit that controls the reception unit, the communication processing unit, and the connection determination unit, in which in a case where it is determined that the other device is not intra-residentially installed by using the connection determination unit, the control unit does not output the digital contents received by the reception unit from the communication processing unit to the other device, which is a feature of the present application.

Advantageous Effects of Invention

A normal user can extra-residentially see and hear intra-residential contents from outside of a residence without exceeding a range of personal use, which improves an availability of the user.

BRIEF DESCRIPTION OF DRAWINGS

FIG. 5 is an explanatory view showing a configuration example of management information.
FIG. 6 is an explanatory view showing an example of a device authentication processing sequence executed between a content reception device and a content transmission device.

FIG. 7 is an explanatory view showing an example of a device registration processing sequence for extra-residential access executed between a content reception device and a content transmission device.

FIG. 8 is an explanatory view showing a configuration example of an extra-residential access information table.

FIG. 10 is an explanatory view showing a screen example of a device registration processing sequence for an extra-residential access.

FIG. 11 is an explanatory view showing an example of a device authentication processing sequence for an extra-residential access executed between a content reception device and a content transmission device.

FIG. 12 is an explanatory view showing a configuration example of a content using descriptor included in contents received by a content transmission device.

FIG. 13 is an explanatory view showing a configuration example of a digital copy control descriptor included in a content received by a content transmission device.

FIG. 14 is an explanatory view showing a configuration example of a digital content output control table which is referred to in a case where contents received by a content transmission device is delivered to an intra-residential content reception device.

FIG. 19 shows a configuration example of threshold information 1900 storing various thresholds and set values used by a device authentication processing unit 108.

FIG. 20 is an explanatory view showing a data configuration example in a case where contents are transmitted by using HTTP protocol in a content audio-visual processing from outside of a residence between a content reception device and a content transmission device.

FIG. 21 shows a configuration example of a packet monitoring table 2100 which is used in a case where filtering by TTL is executed for respective port numbers at a communication processing unit of a content transmission device.

FIG. 23 shows a configuration example of a connection management table 2300 which is used in a case where filtering of a packet for a device authentication processing by TTL is executed for respective TCP connections at a device authentication processing unit of a content transmission device.

FIG. 25 is an explanatory view showing a configuration example of a digital content recording control table which is referred to in a case where contents received by a content transmission device are recorded.

FIG. 28 is an explanatory view showing an example of a device registration processing sequence for an extra-residential access executed among a content reception device, a content transmission device, and a VPN correspondence router.

FIG. 29 is an explanatory view showing an example of a content audio-visual processing sequence from outside of a residence executed between a content reception device and a content transmission device.

DESCRIPTION OF EMBODIMENTS

Embodiments will be explained in reference to the drawings as follows.

First Embodiment

1. System Configuration

Figure 1:
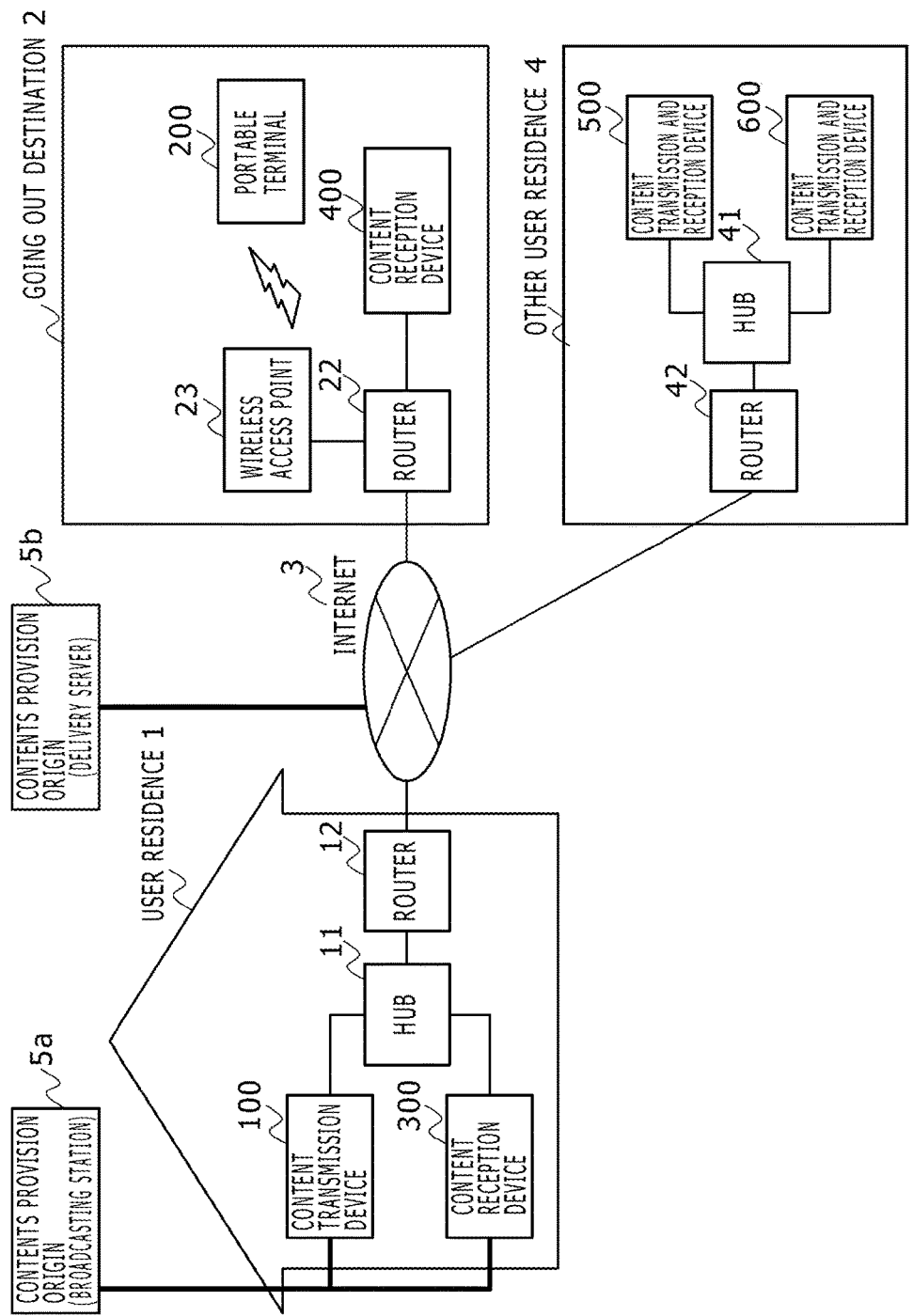
FIG. 1 is an explanatory view showing a configuration example of a system.

FIG. 1 shows a system configuration example according to first embodiment of the present invention. At a user residence 1, a content transmission device 100 and a content reception device 300 are respectively connected to a network hub device 11 by a cable of wired LAN, and the network hub device 11 is connected to a router 12. The router 12 is connected to the internet 3 via a modem, an optical/electrical converter or the like. The content transmission device 100 and the content reception device 300 can receive contents delivered from content provision origins (5a, 5b) via an antenna 10 or via the internet 3. As the contents provision origins, there are a broadcasting station delivering contents from ground digital or satellite digital (BS/CS), a cable via the antenna 10, a content delivery provider providing a VOD service or an IP broadcasting service via the internet 3 which are acTVila or Hikaritv.

At a going out destination of a user (for example, hotel, company or the like) 2, a portable terminal 300 of the user can communicate with a wireless access point 22, and connectable to the internet 3 via the router 22. A content reception device 400 installed at the going out destination is connected to the internet 3 via a router 21.

At another user residence 4, a content transmission and reception device 500 and a content transmission and reception device 600 are respectively connected to a network hub device 11 by a cable of wired LAN, and the network hub device 41 is connected to a router 42. The router 42 is connected to the internet 3 via a modem, an optical/electrical converter or the like.

In the network, standard IP (Internet Protocol) is used as a network protocol, and TCP (Transmission Control Protocol) and UDP (User Datagram Protocol) are used for a transport protocol at a higher order. For transmitting contents, an application protocol at a higher order, for example, RTP (Real-time Transport Protocol) or HTTP (Hyper Text Transfer Protocol), FTP (File Transfer Protocol) or the like is used. Incidentally, although there are IPv4 and IPv6 in IP as differences in version, IP is not limited to either one thereof.

The content transmission device 100, as well as the portable terminal 200, the content reception device 300, the content reception device 400, the content transmission and reception device 500, the content transmission and reception device 600, and the routers 12, 22, 42 respectively own IP addresses for identifying themselves on an IP network. Interface units of respective network communication processing circuits are given MAC (Media Access Control) addresses of 48 bits. In setting IP addresses to respective devices, for example, the router 12 or the router 21 is operated as DHCP servers by DHCP (Dynamic Host Configuration Protocol), and the IP addresses of the respective devices may be allocated therefrom.

Incidentally, in a case of using IPv6 (Internet Protocol Version 6), the respective devices can determine the IP addresses of their own from 64 bits at higher orders of the IP addresses of the routers 12, 22, 42 and the MAC addresses by a method referred to as stateless automatic setting.

Here, although the respective devices are connected by wired LAN at inside of the user residence 1 in FIG. 1, LAN using a wireless access point or the like may be used. A mode in which the hub 11 and the router 12 are integrated, or the hub 41 and the router 42 are integrated will do.

Figure 2:
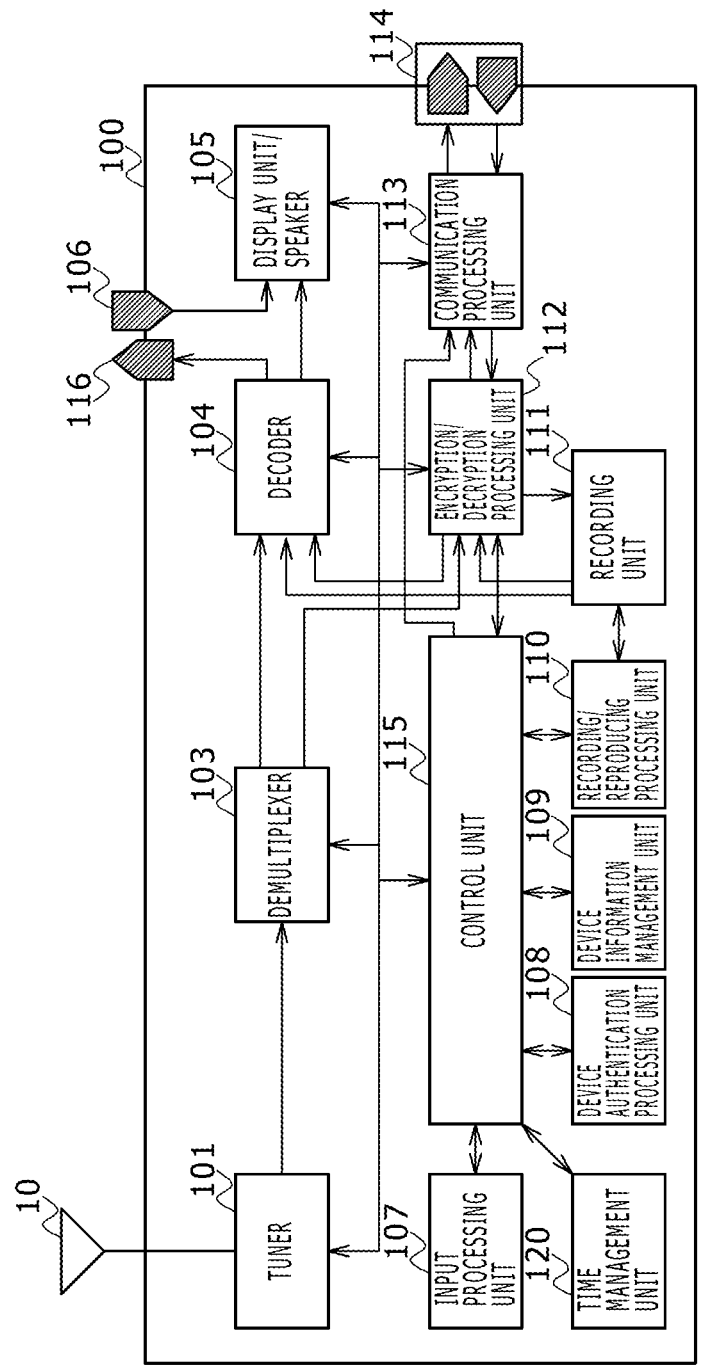
FIG. 2 is an explanatory view showing a configuration example of a content transmission device.

FIG. 2 shows a configuration example of the content transmission device 100. The content reception device 300, the content transmission and reception device 400, the content transmission and reception device 500, and the content transmission and reception device 600 include configurations at least similar to a device authentication processing unit 108, an encryption/decryption processing unit 112, a communication processing unit 113, and a control unit 115.

The content transmission device 100 includes a tuner 101, a demultiplexer 103, a decoder 104, a display unit/speaker 105, a digital image/voice input terminal 106, a digital image/voice output terminal 116, an input processing unit 107, the device authentication processing unit 108, a device information management unit 109, a recording/reproducing processing unit 110, a recording unit 111, the encryption/decryption processing unit 112, the communication processing unit 113, a digital input/output terminal 114, the control unit 115, and a time management unit 120. As the content transmission device 100, for example, a mode of HDD including TV, HDD/BD recorder, PC, NAS (Network Attached Storage) or the like is conceivable.

The tuner 101 receives a digital broadcasting service (ground wave broadcasting, satellite broadcasting or the like) delivered by the contents provision origin 5a via the antenna 10, selects a desired channel from plural channels, and demodulates a program subjected to digital modulation. The plural channel may include a channel received from a coaxial call cable, an optical cable or the like.

The demultiplexer 103 extracts voice data, image data, program information, data, copy control information or the like from a broadcasting program. Incidentally, after the extraction, a descrambler, not illustrated, may descramble the extracted broadcasting program.

The decoder 104 decodes compressed voice data or image data included in a broadcasting program inputted via the tuner 101, contents stored in the recording unit 111, or contents receiving IP content delivery service via the IP network delivered by a contents provision origin 5b (IPTV service, VOD service, download service, etc.) via the digital input/output terminals 114 to decompress into an original voice signal or an original image signal.

The display unit/speaker 105 reproduces an image/voice signal outputted from the decoder 104, and an image/voice signal inputted from the digital terminal 106. Although according to the present embodiment, an example of including the display unit/speaker 105 in the content transmission device 100 is shown, the display unit/speaker 105 may externally be attached in a mode of not having the display unit/speaker 105.

The digital image/voice input terminal 106 inputs uncompressed digital data from an external apparatus.

The digital image/voice output terminal 116 outputs uncompressed digital data to an external apparatus of the display unit/speaker 105 which is externally attached.

The input processing unit 107 manipulates the content transmission device 100 by using a remote controller, a touch panel, a keyboard, a mouse or the like by a user.

The device authentication processing unit 108 authenticates whether the content transmission device 100 and other AV apparatus are apparatus normally qualified by each other by a particular authentication protocol, and shares a key used for encrypting/decrypting contents in order to transmit contents of a copyright protection object via a wired or wireless network.

The device information management unit 109 manages information concerning an apparatus connected via a network in which the authentication is succeeded in the device authentication processing unit 108 or information necessary for the device authentication processing unit 108 in carrying out device authentication.

The recording/reproducing processing unit 110 executes a recording control for recording contents to the recording unit 111 and a reproducing control for reproducing contents recorded at the recording unit 111. Contents of an object of protecting a copyright is encrypted to decode, and decrypted to reproduce in accordance with a prescribed procedure by using the encryption/decryption processing unit 112. Although according to the present embodiment, an example of including the recording/reproducing processing unit 110 to the content transmission device 100, a mode without having the recording/reproducing processing unit 110 will do.

The recording unit 111 is a memory for recording a broadcasting program. The memory may be included or attachable and detachable HDD or optical disk (DVD or BD), a memory card, or a hybrid mode combining these.

The encryption/decryption processing unit 112 decrypts IP contents received via the digital input/output terminal 114 via a network by using a key shared at the device authentication processing unit 108 in accordance with a prescribed procedure defined and operated by the contents provision origins 5a and 6b (for example, DTCP-IP, Marlin, PlayReady, CMLA-OMA V2) or the like.

The encryption/decryption processing unit 112 executes encryption in accordance with a prescribed procedure which is previously determined for respective input paths or record media (for example, CSS in a case of DVD, AACS in a case of VD, original encryption code in a case of HDD) when a broadcasting program inputted via the tuner 1 or the decrypted contents is(are) recorded to the recording unit 111.

Similarly, the encryption/decryption processing unit 112 decrypts contents stored in the recording unit 111 or contents stored to mounted media in accordance with a prescribed procedure which is previously determined for respective input paths or record media.

The encryption/decryption processing unit 112 executes encryption by using a key shared at the device authentication processing unit 108 when a broadcasting program received via the tuner 101 or contents decoded as described above is(are) transmitted via the digital input/output terminal 114 via the network.

The communication processing unit 113 transmits a broadcasting program inputted via the tuner 101, contents stored in the recording unit 111, or a control command created at the device authentication processing unit 108 or the control unit 115 to other device connected by the digital input/output terminal 114 and the network. The communication processing unit 113 receives contents or control commands from other device connected via the digital input/output terminal 114 and the network. Here, although the present embodiment shows an example in which the communication processing unit 113 is a wired network, a wireless communication processing realizing a wireless network may be added.

The demultiplexer 103, the decoder, the input processing unit 107, the device authentication processing unit 108, the device information management unit 109, the recording/reproducing processing unit 110, the encryption/decryption processing unit 112, the communication processing unit 113, and the time management unit 120 can realize functions of the respective units described above by developing various programs stored to the recording unit 111 to a memory, not illustrated, and executing the various programs by the control unit 115.

The respective functions realized as software can also be realized as hardware by creating an integrated circuit as processing units executing respective processings. In the following, in order to simplify the explanation, the explanation will be given such that the respective processings realized by executing the respective functions of the demultiplexer 103, the decoder 104, the input processing unit 107, the device authentication processing unit 108, the device information management unit 109, the recording/reproducing processing unit 110, the encryption/decryption processing unit 112, the communication processing unit 113, and the time management unit 120 by the control unit 115 are independently executed by the respective processing units. Incidentally, in a case of realizing the respective processing units by hardware, the respective processing units independently execute the respective processings.

The digital input/output terminal 114 inputs and outputs contents or control commands to and from other device via the network. As described above, the VOD service or the IP broadcasting service provided by the contents delivery origin 5b is received via the digital input/output terminal 114.

The control unit 115 integrally controls operations of the tuner 101, the demultiplexer 103, the decoder 104, the display unit/speaker 105, the digital image/voice input terminal 106, the digital image/voice output terminal 116, the input processing unit 107, the device authentication processing unit 108, the device information management unit 109, the recording/reproducing processing unit 110, the recording unit 111, the encryption/decryption processing unit 112, the communication processing unit 113, the digital input/output terminal 114, and the time management unit 120 of the content transmission device 100.

The time management unit 120 manages time by using time information included in a broadcasting signal inputted via the tuner 101 and time information provided by the NTP (Network Time Protocol) server present on the internet 3. NTP is a protocol for synchronizing a timepiece provided to a device to correct time in the device connected to the network.

Figure 3:
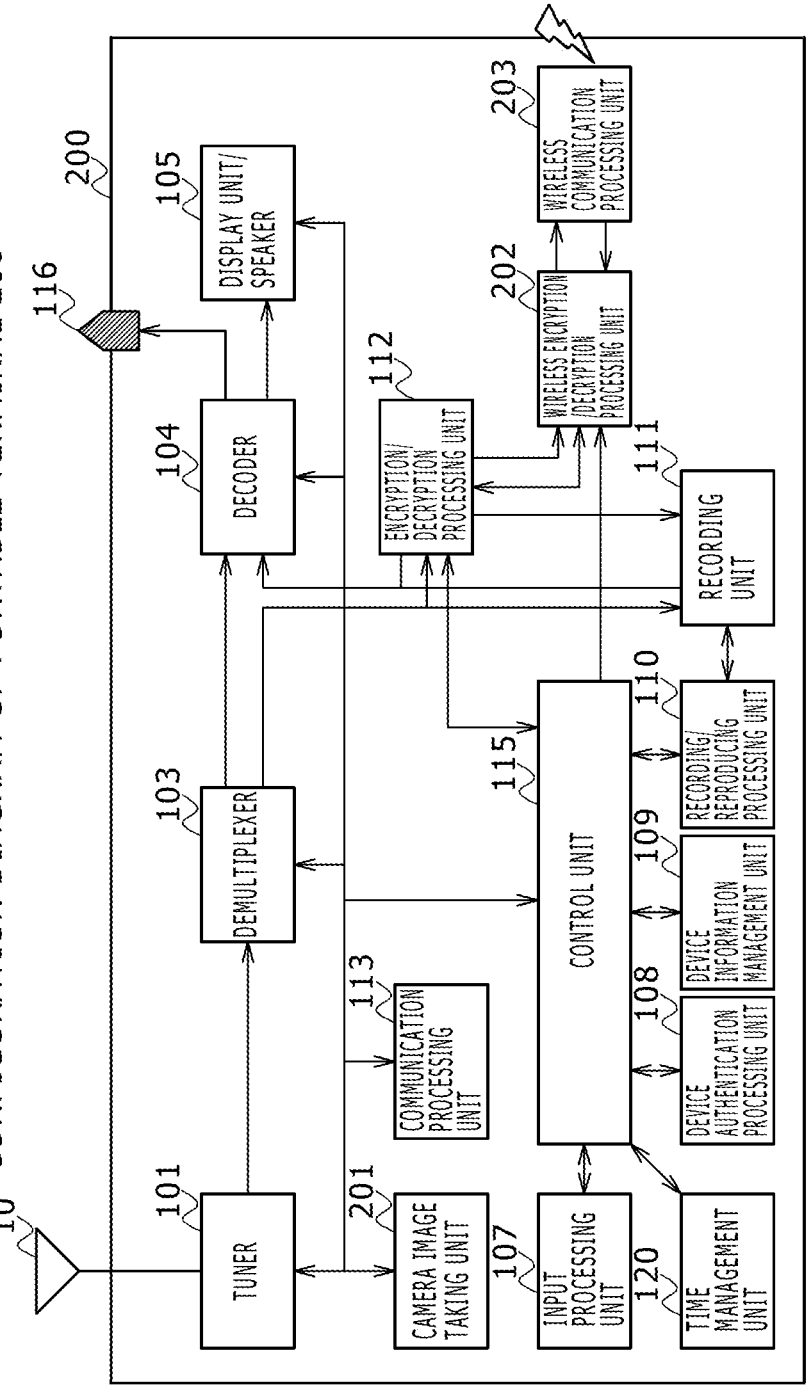
FIG. 3 is an explanatory view showing a configuration example of a portable terminal (content reception device).

FIG. 3 shows a configuration example of the portable terminal (content reception device) 200.

The portable terminal 200 is configured by the tuner 101, the demultiplexer 103, the decoder 104, the display unit/speaker 105, the digital image/voice output terminal 116, a camera image taking unit 201, the communication processing unit 113, the input processing unit 107, the device authentication processing unit 108, the device information management unit 109, the recording/reproducing processing unit 110, the recording unit 111, the encryption/decryption processing unit 112, a wireless encryption/decryption processing unit 202, a wireless communication processing unit 203, the control unit 115, and the time management unit 120.

The camera image taking unit 201 is a portion of taking an image by a camera.

The recording unit 111 is a nonvolatile memory storing a dynamic pitcher/still picture taken by the camera image taking unit 201, a program received via the tuner 101, personal information, information of an address book, and suchlike. A built-in or detachable memory mode is conceivable.

The wireless encryption/decryption processing unit 202 is a portion of encrypting/decrypting contents or control data received via the wireless communication processing unit 203 via a wireless network, or contents or control data outputted from the encryption/decryption processing unit 214 by using an encryption algorithm for a wireless network (for example, WEP (Wired Equivalent Privacy) or WPA2 (Wi-Fi Protected Access), etc.).

The wireless communication processing unit 203 is a portion of transmitting/receiving contents or control commands to/from the wireless access point 23 connected by wireless LAN or other AV apparatus.

The other portions are similar to those of the content transmission device 100.

Figure 4:
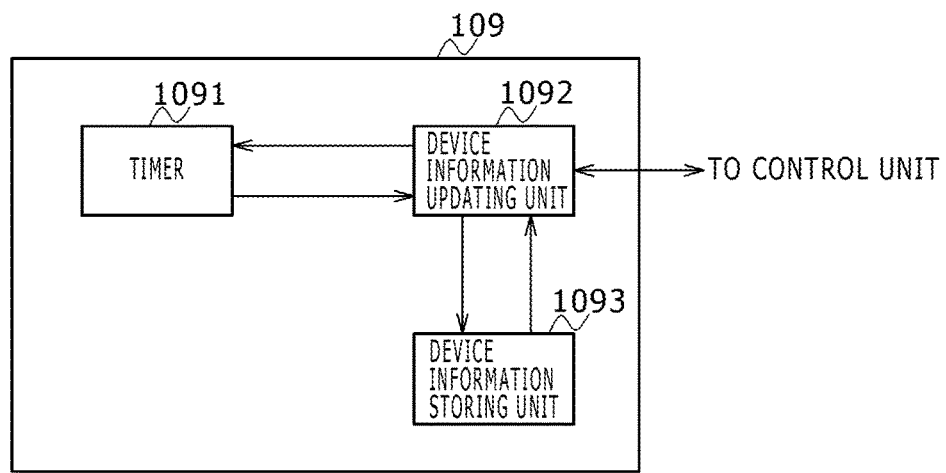
FIG. 4 is an explanatory view showing a configuration example of a device information management unit.

FIG. 4 shows a configuration example of the device information management unit 109 in the respective apparatus.

The device information management unit 109 includes a timer 1091, a device information updating unit 1902, and a device information storing unit 1093.

The timer 1091 is a portion used for measuring time in a case where it is confirmed whether a device of a counter-party of an authentication is present at inside of a residence by the device authentication processing unit 108 as described later, or in a case of managing an effective period of registration information stored to the device information storing unit 1093 as described later.

The device information updating unit 1092 is a portion of managing the effective period of the registration information held at the device information storing unit 1093 described later, and executing registration/updating/deletion as necessary.

The device information storing unit 1093 is a portion of holding information concerning the device of the counter-party of the authentication in a case where the device authentication is succeeded at the device authentication processing unit 109.

FIG. 5 is a configuration example of device information 5000 stored at the device information storing unit 1093.

The device information 5000 is configured by a definition table 5100, an intra-residential device information table 5200, and an extra-residential device information table 5300.

The definition table 5100 is configured by a device authentication maximum number 5101, extra-residential registration maximum number 5102, an intra-residential counter maximum value 5103, an extra-residential counter maximum value 5104, a simultaneous access maximum number 5105, and an extra-residential simultaneous maximum number 5106.

The device authentication maximum number 5101 indicates a maximum number capable of executing device authentication between a transmission device and a reception device of contents by using the device authentication processing unit 108.

The extra-residential registration maximum number 5102 indicates a maximum number of registerable extra-residential access devices. For example, "20" is set.

The intra-residential counter maximum value 5103 indicates a maximum value of intra-residential counters set to the timer 1091.

The extra-residential counter maximum value 5104 indicates a maximum number of extra-residential counters set to the timer 1091.

The simultaneous access maximum number 5105 indicates a maximum value of accepting content access requests.

The extra-residential simultaneous maximum number 5106 indicates a maximum number of accepting content access requests from outside of a residence. For example, "1" is set.

On the other hand, the intra-residential device information table 5200 is configured by ID 5201, device ID 5202, address information 5203, intra-residential counter value 5204, transmission status 5205, exchange key for MOVE 5206, an intra-residential exchange key 5220, an authentication device number 5221, and a simultaneous access number 5222.

ID 5201 indicates a registration number of the table.

The device ID 5202 indicates an identifier uniquely identifying each device. The device ID 5202 is information inherent to the device created by a particular authentication organization, and previously preserved in a nonvolatile memory in manufacturing each device, or safely recorded to a nonvolatile memory after executing a particular registration processing after purchase and has a unique value for each device. Otherwise, information of a public key or the like may be included.

Address information 5203 indicates IP address (IPv4/IPv6) or MAC address of each device on a network. The IP address may be limited to an address mode assuming an intra-residential use such as private address or local address.

The intra-residential counter value 5204 indicates a current value of the intra-residential counter set to the timer 1091.

The transmission status 5205 indicates a situation of transmitting contents to a content reception device (for example, accessing, stop, etc.).

The exchange key for MOVE 5206 indicates key information or additional information thereof (label, kind of key, etc.) used in encryption/decryption processing when contents are moved (MOVE) to a content reception device. The exchange key for MOVE is shared along with the content reception device in conformity with a prescribed procedure, has a using method different from that of the intra-residential exchange key 5220 described later, and has a value which differs for each content reception device.

The intra-residential exchange key 5220 indicates key information or additional information thereof (label, kind of key, etc.) used in encryption/decryption processing when contents are transmitted between a content transmission device and a content reception device disposed at inside of a residence. Details thereof will be explained in reference to FIG. 6.

The authentication device number 5221 indicates a number of content reception devices finished with device authentication with the own device. In a case where the value reaches the device authentication maximum number 5101, the device authentication processing thereafter is not executed, or the device authentication request from the content reception device is not accepted.

The simultaneous access number 5222 indicates a number of content reception devices which are going to start transferring contents with the own device, or already executing to transfer contents with the own device. In a case where the value reaches the simultaneous access maximum number 5105, contents transfer thereafter is not executed, or a content transmission request from a content reception device is not accepted.

The extra-residential device information table 5300 is configured by ID 5301, device ID 5302, address information 5303, an extra-residential exchange key 5304, a transmission status 5305, an extra-residential counter value 5306, an extra-residential registration number 5321 and an extra-residential simultaneous access number 5322.

ID 5301 indicates a registration number of the table.

The device ID 5302 indicates an identifier for uniquely identifying each device, and information similar to the device ID 5202.

The address information 5303 indicates an IP address (IPv4/IPv6), or MAC address of a content reception device accessed extra-residentially.

The extra-residential exchange key 5304 indicates key information or additional information thereof (label, kind of key, etc.) used in the encryption/decryption processing when contents are transmitted between a content transmission device and an extra-residential content reception device.

The transmission status 5305 indicates a situation of transmitting to the extra-residential content reception device (for example, accessing, stop or the like).

The extra-residential counter value 5306 indicates a current value of the extra-residential counter set to the timer 1091.

The extra-residential registration number 5321 indicates a registration number of a content reception device accepting a remote access from outside of the residence to the own device. An explanation will be given of a procedure of registering the content reception device in reference to FIG. 7 and FIG. 9 described later. In a case where the value reaches the extra-residential registration maximum number 5102, a registration request thereafter is not accepted.

The extra-residential simultaneous access number 5322 indicates a number of extra-residential content reception devices which is going to start transferring contents with the own device, or which is already executing to transfer contents with the own device. In a case where the value reaches the extra-residential simultaneous maximum number 5106, contents transfer thereafter is not executed, or a content transmission request from an extra-residential content reception device is not accepted.

Here, although according to the present embodiment, the intra-residential counter value 5204 and the extra-residential counter value 5306 are respectively provided separately in the intra-residential device information table 5200 and the extra-residential device information table 5300, the intra-residential counter value 5204 of the intra-residential device information table 5200 may be shared.

2. Authentication of Device Present at Inside of Residence

FIG. 6 shows a device authentication processing sequence executed between the content transmission device 100 and the content reception device 300 present at inside of the user residence 1 in the system configuration shown in FIG. 1. Hereinafter, an authentication processing explained in reference to FIG. 6 is referred to as normal authentication.

Here, TCP is used as the protocol for transmitting/receiving information for a device authentication processing. When various kinds of information of an authentication request to a device of a counterparty and an authentication response thereto are transmitted, confirmation of reception thereto is returned from the device of the counterparty, thereby, a communication path capable of detecting a transmission error is ensured. Incidentally, in FIG. 6, transmission/reception of data for establishment and abandonment of a connection by TCP is omitted.

Data transmitted/received between the content transmission device 100 and the content reception device 300 is transmitted as IP packets. In a device authentication processing S600, the content transmission device 100 and the content reception device 300 monitor TTL (Time To Live) of received packets, and prevent an access from outside of the user residence 1 by abandoning packets set with values of TTL exceeding an intra-residential reception restriction TTL value of a TTL table 1910 indicated in FIG. 19 described later.

For that purpose, the content transmission device 100 and the content reception device 200 set TTL of transmitting packets to be equal to or less than the intra-residential restriction TTL value 1911 of the TTL table 1910.

In the present sequence, first, the content reception device 300 creates an authentication request. The device authentication processing unit 108 of the content reception device 300 attaches information inherent to the device including the device ID, and a deed for the information inherent to the device to the authentication request to transmit the content the reception device 100 via the communication processing unit 113 (S601).

When the device authentication processing unit 108 of the content transmission device 100 receives the authentication request via the communication processing unit 113 and transmits confirmation of reception thereof to the content reception device 300 (S602), the device authentication processing unit 108 of the content reception device 100 creates an authentication request from an own side, and attaches information inherent to the content transmission device 100 and a deed thereof to the authentication request to transmit to the content reception device 300 similar to the case of the content reception device (S603).

The device authentication processing unit 108 of the content reception device 300 receives the authentication request, and transmits confirmation of reception thereof to the content transmission device 100 (S604).

Next, the device authentication processing unit 108 of the content transmission device 100 verifies respective information received in response to the authentication request, and transmits an authentication response attached with parameters necessary for creating the key information to the content reception device 300 (S605).

The device authentication processing unit 108 of the content reception device 300 receives the authentication response and transmits confirmation of reception thereof to the content transmission device 100 (S606), thereafter, transmits an authentication response attached with parameters necessary for creating the key information to the content transmission device similar to the case of the content transmission device (S607), and creates an authentication key common to the content transmission device 100 by using necessary parameters.

The device authentication processing unit 108 of the content transmission device 100 receives the authentication response and transmits confirmation of reception thereof to the content reception device 300 (S608), and creates an authentication key common to the content reception device 300 by using necessary parameters similar to the content reception device.

The device authentication processing unit 108 of the content transmission device 100 and the device authentication processing unit 108 of the content reception device 300 create and share the authentication key common to each other in the procedure up to this point.

Next, the content transmission device 100 confirms whether the content reception device 300 is registered to the device information table 5200 and a value is set to the intra-residential counter value 5204 in order to confirm whether the content reception device 300 is a device present at inside of the residence. In a case where the value is not set to the intra-residential counter value 5204 as a result of the confirmation, the content transmission device 100 transmits a statement of preparing an intra-residential confirmation to the content reception device 300 (S609).

When the device authentication processing unit 108 of the content reception device 300 receives the notification of preparing the intra-residential confirmation, and transmits confirmation of reception thereof to the content transmitting device 100 (S610), the device authentication processing unit 108 creates a notification of preparing an intra-residential confirmation from the own side to transmit to the content transmission device 100 (S611).

When the device authentication processing unit 108 of the content transmission device 100 receives the notification of preparing the intra-residential confirmation and transmits confirmation of reception thereof to the content reception device 300 (S612), the device authentication processing unit 108 transmits a request for setting intra-residential confirmation attached with information necessary for intra-residential confirmation to the content reception device 300 (S613).

The device authentication processing unit 108 of the content reception device 300 receives the request for setting the intra-residential confirmation, and executes a message authentication code creating processing based on data included in the request for setting the intra-residential confirmation as a preparation necessary for the intra-residential confirmation, and transmits confirmation of reception to the content transmission device 100 (S614).

The device authentication processing unit 108 of the content transmission device 100 receiving the confirmation of reception executes a message authentication code creating processing based on data transmitted to the content reception device 300 at S613, starts the timer 1091 in the device information management unit 103, thereafter, transmits a request for executing an intra-residential confirmation including the message authentication code in order to confirm whether the content reception device 300 is present at inside of the residence to the content reception device 300 (S615).

The device authentication processing unit 108 of the content reception device 300 receives the request for executing the intra-residential confirmation, and transmits confirmation of reception including the message authentication code created at S614 to the content transmission device 100 (S616).

When the device authentication processing unit 108 of the content transmission device 100 receives confirmation of reception, the device authentication processing unit 108 stops the timer 1091, and confirms whether a measured value (T1) until receiving the confirmation reception after issuing the request for executing the intra-residential confirmation does not exceed an intra-residential confirmation time out value (T) 1921 of an intra-residential confirmation threshold table 1920. Also, the device authentication processing unit 108 confirms whether the message authentication code included in the received confirmation of reception is correct.

In a case where the measured value (T1) the intra-residential confirmation time out value (T) 1921 of the intra-residential confirmation threshold table 1920, and the received message authentication code is correct, the device authentication processing unit 108 determines that the content reception device 300 is present at inside of the residence, and is a device present in a range of personal use, and transmits a result of the intra-residential confirmation to the content reception device 300 (s617).

On the other hand, in a case where the measured value (T1)>the intra-residential confirmation time out value (T) 1921 of the intra-residential confirmation threshold table 1920, or in a case where the received message authentication code is not correct, the device authentication processing unit 108 of the content transmission device 100 determines that there is a possibility that the content reception device 300 is present at outside of the residence, or the content reception device 300 is an illegal device, and finishes the device authentication processing by interrupting processings thereafter. The device authentication processing unit 108 of the content reception device 300 receiving a result of the intra-residential confirmation confirms whether the message authentication code received at S615 is correct, and transmits confirmation of reception to the content transmission device 100 in a case where the message authentication code is correct (S618).

S609 to S618 represent the intra-residential confirmation method for the intra-residential access in the normal authentication. Here, in a case where the content reception device 300 is registered to the intra-residential device information table 5200, and a value is set to the intra-residential counter value 5204, the intra-residential confirmation processing is omitted.

On the other hand, in a case where the received message authentication code is incorrect, the device authentication processing unit 108 finishes the device authentication processing by interrupting processings thereafter. When confirmation of reception is received, the device authentication processing unit 108 of the content transmission device 100 creates an exchange key used in encrypting contents, and encrypts the exchange key by using the authentication key to transmit to the content reception device 300 along with ID for identifying the exchange key (S619).

The device authentication processing unit 108 of the content reception device 300 decrypts the exchange key transmitted from the content transmission device 100 by using the authentication key to transmit confirmation of reception (S620).

When the confirmation of reception is received, the device authentication processing unit 108 of the content transmission device 100 registers information concerning the content reception device 300 to the intra-residential device information table 5200 in the device information management unit 109 (S621).

For example, as shown in a record 5211 of ID 5201 in the intra-residential device information table 5200, the device authentication processing unit 108 sets the device ID of the content reception device 300 received at S601 to the device ID 5202, sets the IP address of the content reception device 300 on a network to the address information 5203, sets the intra-residential counter maximum value 5103 in the definition table 5100 to the intra-residential counter value 5204, and sets "stop" to the transmission status 5205.

The device authentication processing unit 108 of the content transmission device 100 and the device authentication processing unit 108 of the content reception device 300 can share a common exchange key by the processing procedure shown in FIG. 6. The exchange key is set to the intra-residential exchange key 5220 in the intra-residential device information table 5200 along with additional information concerning the exchange key and used for creating a common key for encrypting/decrypting contents. Also, the processings of S609 and S613 and processings of S617 and S619 may respectively be summarized.

The procedure of FIG. 6 is explained concerning the intra-residential device authentication processing executed between the content transmission device 100 and the content reception device 300 in a case of transmitting contents at inside of a residence.

3. Extra-Residential Access Device Registration Processing

FIG. 7 shows an example of extra-residential access device registration processing sequence executed between the content transmission device 100 and the portable terminal (content reception device) 200 which are present at inside of the user residence 1 in the system configuration shown in FIG. 1. The extra-residential access device is a device executing an extra-residential access from outside of a residence to a device at inside of the residence with seeing/hearing or copying, and Move of a copyright protection content as an object. In FIG. 7, the portable terminal (content reception device) 200 becomes an extra-residential access device.

It is assumed that the portable terminal (content reception device) 200 is present at inside of the user residence 1 when the procedure is executed. The content transmission device 100 and the content reception device 200 prevent an access from outside of the user residence 1 by monitoring TTL of received packets, and abandoning a packet which is set with a value of TTL exceeding the intra-residential restriction TTL value 1911 of the TTL table 1910 shown in FIG. 19 described later. Therefore, the content transmission device 100 and the content reception device 200 set TTL of transmitted packets to be equal or less than the intra-residential restriction TTL value 1911 of the TTL table 1910.

First, the content transmission device 100 and the content reception device 200 execute the device authentication processing S600 explained in reference to FIG. 6.

Thereafter, the device authentication processing unit 108 of the content reception device 200 creates an extra-residential access device registration request to transmit to the content transmission device 100 (S701). The extra-residential access device registration request can include information inherent to the device and a random number created by using a prescribed calculation algorithm, a password which a user sets for extra-residential access or the like.

The device authentication processing unit 108 of the content transmission device 100 receives the extra-residential access device registration request, and determines whether the content reception device 200 has been registered to the extra-residential device information table 5300 by using, for example, the device ID 5302 or the address information 5303 at 5702. When the content reception device 200 has already been registered, the device authentication processing unit 108 of the content reception device 100 returns confirmation of reception including a status that the content reception device 200 has succeeded to register or has finished the registration to the content reception device 200 and the operation proceeds to 5704.

In a case where the content reception device 200 has not been registered yet, the device authentication processing unit 108 of the content transmission device 100 refers to the extra-residential registration number 5321 in the extra-residential device information table 5300, and determines whether the number of devices registered for extra-residential access is less than the extra-residential registration maximum number 5102 of the definition table 5100. When the number has already reached the maximum number, the device authentication processing unit 108 of the content transmission device 100 interrupts the registration processing, and transmits confirmation of reception including a status that registration is impossible or the number reaches the maximum number to the content reception device 200. On the other hand, in a case where the number does not reach the maximum number, the device authentication processing unit 108 of the content reception device 100 confirms that the device ID's of the content reception device 200 received at S601 and S701 coincide with each other, thereafter, sets the device ID of the content reception device 200 to the device ID 5302 in the extra-residential device information table 530, sets MAC address of the content reception device 200 on the network to the address information 5303, sets "stop" to the transmission status 5305, and sets the extra-residential counter maximum value 5104 in the definition table 5100 to the extra-residential counter value 5306 (S703). Confirmation of reception including a registration-succeeded or registered status at 5704 is transmitted to the content reception device 200 at 5704.

The device authentication processing unit 108 of the content reception device 200 receiving the confirmation of reception from the content transmission device 100 refers to the status included in the confirmation of reception, and in the case of the registration-succeeded or registered status, creates or updates an extra-residential access information table 60000 stored to the device management information unit 109 (S705).

The device authentication processing unit 108 of the content transmission device 100 and the device authentication processing unit 108 of the content reception device 200 can execute the registration processing as an extra-residential access device only for a device which has been succeeded in the device authentication by executing processings from S701 to 5715 in addition to the device authentication processing S600.

A procedure of FIG. 7 has explained the extra-residential access device registration processing S700 which is executed for registering the content reception device 200 to the content transmission device 100 between the content transmission device 100 and the content reception device 200 prior to transmit contents to an extra-residential device.

FIG. 8 shows a configuration example of the extra-residential access information table 60000.

The extra-residential access information table 60000 is configured by ID 60001, a connection destination address information 60002, and registration information 60003.

ID 60001 indicates a registration number of the table.

The address information 60002 indicates IP address, MAC address, URL (Uniform Resource Locator), etc. for accessing to respective devices on an intra-residential network from outside of a residence.

The registration information 60003 indicates a user name and a password necessary for the content reception device 200 to log in the content transmission device 100 or the router 12 from outside of the residence.

A key used for encryption/decryption of contents in an intra-residential access can be shared and at the same time, the content reception devices which execute the intra-residential access and the extra-residential access to the content reception device can simultaneously be registered only in a case of confirming that the devices are devices which are normally qualified between the devices and that the devices are devices present at inside of the residence by executing the processings of the procedures shown in FIG. 6 and FIG. 7.

Here, after finishing the ordinary device authentication processing S600, the content transmission device 100 may provide a time period capable of receiving the extra-residential access device registration request, and the content reception device 200 may be necessitated to issue the extra-residential access device registration request within a prescribed time period (for example, 24 hours).

Figure 9:
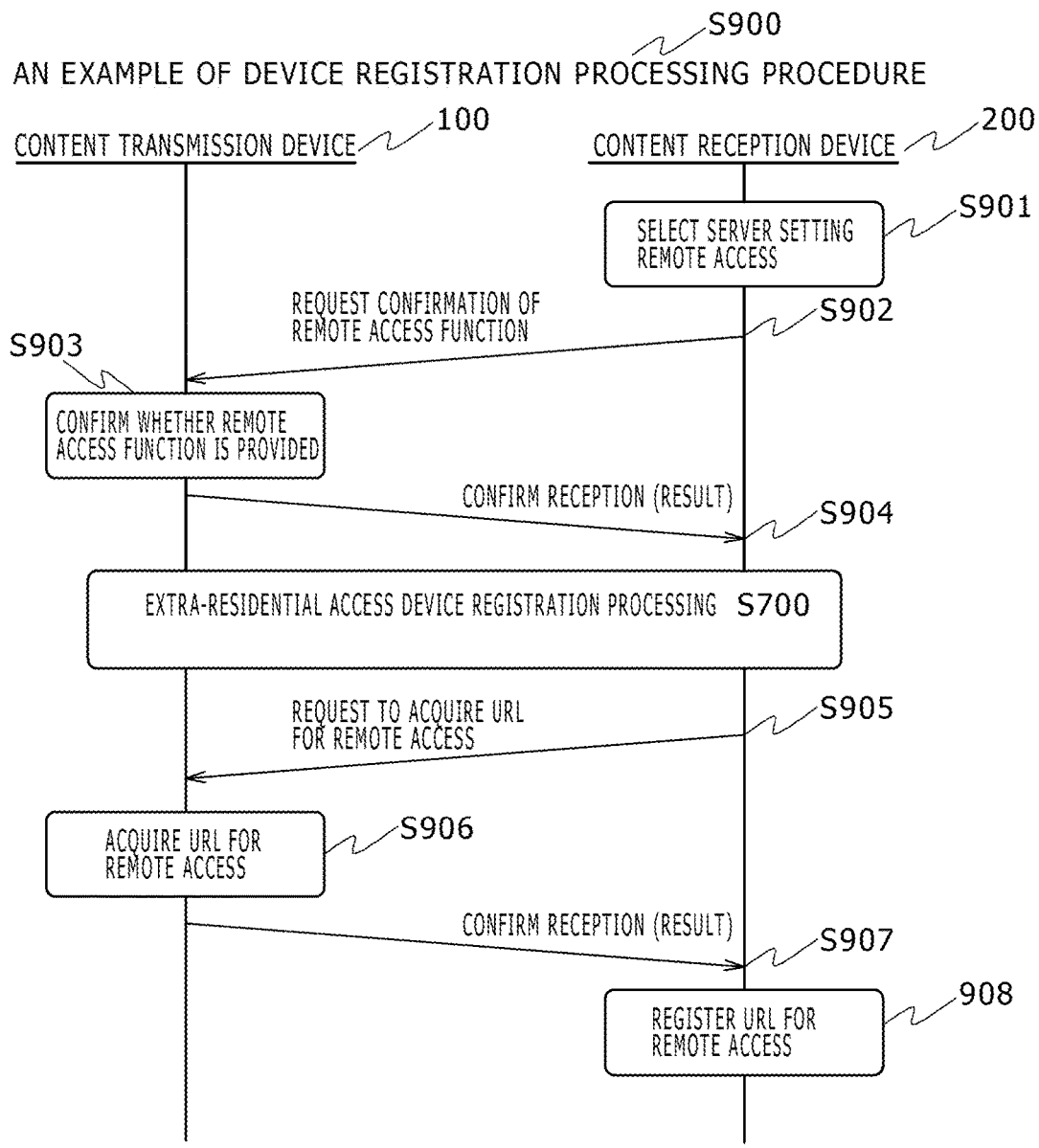
FIG. 9 is an explanatory view showing an example of a device registration processing sequence for an extra-residential access executed between a content reception device and a content transmission device.

FIG. 9 and FIG. 10 explain an example of a sequence of registered to the content transmission device 100 by manipulating the portable terminal (content reception device) 200 actually by a user by using the processings of the procedures shown in FIG. 6 and FIG. 7. Incidentally, a display content and a display order in a screen of the portable terminal 200 shown in FIG. 10 is only an example for explaining the present embodiment, and the present embodiment is not limited thereto.

The user displays a screen 1001 for registering a remotely accessed server (that is, content transmission device) 100 by using a manipulating button or respective set menus of the portable terminal 200. When the user selects "2) set connection server" on the screen 1001, the portable terminal 200 displays a screen 1002 for displaying a list of content transmission devices present on the intra-residential network and including a function of delivering contents.

When the user selects "server 1" (in the case of the present embodiment, the content transmission device 100 is indicated) on the screen 1002 (S901), the device authentication processing unit 108 of the portable terminal 200 creates a remote access function confirmation request for confirming the presence of correspondence with a remote access function to the content transmission device to transmit to the content transmission device 100 (S902).

The device authentication processing unit 108 of the content transmission device 100 receives the remote access function confirmation request, and determines whether the own device includes the remote access function by, for example, whether the extra-residential registration maximum number 5102 and the extra-residential device information table 5300 are present at the definition table 5100 in the device information 5000. The device authentication processing unit 108 of the content transmission device 100 returns confirmation of reception including a determination result to the content reception device 200 (S904).

The device authentication processing unit 108 of the portable terminal 200 refers to the determination result received at S904, and displays the server 1 as a connectable server as shown in the screen 1003 in a case where the "server 1" includes the remote access function as in a screen 1003. The screen 1003 displays that "server 1" includes the remote access function, and displays "2) register remote access" for registering the own device to "server 1".

When the user selects "2) register remote access" on the screen 1003, the device authentication processing unit 108 of the portable terminal 200 executes the extra-residential access device registration procedure S700 shown in FIG. 7 with the content transmission device 100, and registers the portable terminal 200 to the extra-residential device information table 5300 of the content transmission device 100.

Next, the portable terminal 200 transmits a request for acquiring URL for remote access for acquiring information necessary for remotely accessing to the content transmission device 100 from outside of the residence to the content transmission device 100 (S905).

The device authentication processing unit 108 of the content transmission device 100 receives the request for acquiring URL for remote access, and acquires information necessary for remotely accessing to the own device—for example, global IP address for accessing to the own device or the router 12, URL acquired from DDNS (Dynamic Domain Name System) server, a port number or the like—from the own device or the router 12 as necessary at 5906. The device authentication processing unit 108 of the content transmission device 100 returns confirmation of reception including the information to the content reception device 200 (S907).

The device authentication processing unit 108 of the portable terminal 200 refers to the information received at S907 to register to the address information 60002 of the extra-residential access information table 60000 (S908).

4. Information Describing Restriction of Using Contents

An explanation will be given of an example of a content using descriptor 1200 and a digital copy control descriptor 1300 as information describing a restriction of using contents accompanied with the contents which the content transmission device 100 receives via the tuner 101, the cable, and the internet 3 in reference to FIG. 12 and FIG. 13. Also, an explanation will be given of output possible/impossible of an output from the digital input/output terminal 114 of the content transmission device 100, presence/absence of encryption, an encryption mode, and a recording control in accordance with information describing the restriction of using contents in reference to FIG. 14 and FIG. 25.

FIG. 12 shows a configuration of the content using descriptor 1200 accompanied with contents which the content transmission device 100 receives via the tuner 101, the cable, and the internet 3. The descriptor is set to SDT (Service Description Table) or EIT (Event Information Table) of, for example, SI (Service Information: program alignment information).

The content using descriptor 1200 indicates information of controlling record of received contents or output to other content reception device, and is information added for controlling record/output of the contents by the provision origins 5a and 5b of the contents (for example, broadcasting station or copyright owner side of content service provider or the like). The content using descriptor 1200 is used in combination with the digital copy control descriptor described later.

The content using descriptor 1200 includes a copy restriction mode (copy_restriction_mode) 1201, a resolution restriction bit (image_constraint_token) 1202, a retention control bit (retention_mode) 1203, a retention acceptable time (retention_state) 1204, output protection bit (encryption mode) 1205, and mode access restriction mode (remote-_access_restriction_mode) 1206. Incidentally, the configuration of the content using descriptor 1200 may include other information and is not limited to the configuration example.

The copy restriction mode (copy_restriction_mode) 1201 indicates a copy number restriction mode and is determined by an operation rule of a content enterprise. For example, the copy restriction mode signifies that in a case of the value of "0", the copy number restriction is operated, and in a case of "1" of the value, the copy number restriction is not operated. In a case where the information is not included (arranged), it is regarded that "1" is set as default.

The resolution restriction bit (image_constraint_token) 1202 indicates presence/absence of restricting an image quality or an image signal outputted from the digital image/voice output terminal 116. For example, the resolution restriction bit signifies that in a case of "0" of the value, the resolution of the image/voice output is restricted, and in a case of "1" of the value, the resolution is not restricted.

The retention control bit (retention_mode) 1203 indicates whether retention of contents received with conditions is accepted. For example, the retention control bit signifies that in a case of "0" of the value, the retention can be executed even when the digital copy control descriptor 1300 described later is "prohibit copy", and in a case of "1" of the value, the retention cannot be executed.

The retention acceptable time (retention_state) 1204 indicates retention acceptable time after receiving contents, for example, information of without restriction, one hour and 30 minutes, three hours, one day, or one week is set.

The output protection bit (encryption mode) 1205 indicates presence/absence of output protection when the digital copy control descriptor 1300 described later outputs contents of "copiable without restriction condition" from the digital input/output terminal 114. For example, the output protection bit signifies that in a case of "0" of the value, a processing of output protection is executed, and in a case of "1" of the value, the processing of output protection is not executed.

The remote access restriction mode (remote_access_restriction_mode) 1206 indicates a mode of restricting use of received contents from terminals (portable terminal 200, content reception device 400, content transmission and reception devices 500 and 600) present at outside of the residence such as the going out destination 2 or the other user residence 4, and is determined by an application rule of a content enterprise. For example, the remote access restriction mode signifies that in a case of "0" of the value, the use by the remote access is prohibited, in a case of "1" of the use, the use by the remote access is not restricted. The content provision origins (5a, 5b) can restrict the remote access to the contents by using the values in a processing thereafter.

FIG. 13 shows a configuration example of the digital copy control descriptor 1300 inserted to contents which the content transmission device 100 receives via the tuner 101, the cable, and the internet.

The digital copy control descriptor 1300 indicates information of controlling copy generation in a digital recording device, and is information added to the content provision origins (for example, broadcasting station or copyright owner side of content service provider or the like) in a case of executing digital copy and analog copy for transmitting information concerning record/copy to the contents to a recording device.

The digital copy control descriptor 1300 is configured by digital copy control information (digital_recording_control-_data) 1301, copy control type information (copy_control-_type) 1302, and output copy control information (APS- _control_data) 1303. Incidentally, the configuration of the digital copy control descriptor 1300 may include other information, and is not limited to the configuration example.

The digital copy control information (digital_recording_control_data) 1301 indicates information for controlling copy generation of received contents. For example, the digital copy control information signifies that in a case of "00" of the value, "copiable without restriction condition", in cases of "01" and "11", "prohibit copy", in a case of "10", "copiable only for one generation".

The copy control type information (copy_control_type) 1302 indicates information of a type for controlling copy generation of received contents. For example, the copy control type information signifies that in a case of "01" of the value, the contents are encrypted by using an encryption system (for example, DTCP, DTCP-IP, Windows Media DRM, etc.) designated by the provision origin of contents to output from the digital input/output terminal 114, and in a case of "11" of the value, the contents are outputted from the digital input/output terminal 114 without being encrypted.

The analog output copy control information (APS_control_data) 1303 indicates information of restricting copy of an analog output in a case of "01" or "11" of the value of the copy control type information. For example, the analog output copy control information signifies that in a case of "00" of the value, copiable without restriction condition, and in a case of the other value, copy is restricted by some restriction condition.

FIG. 14 indicates a configuration example of a digital content output control table 1400 in a case where the content transmission device 100 refers to the content using descriptor 1200 and the digital copy control descriptor 1300 inserted to contents which the content transmission device 100 receives via the tuner 101, the cable, and the internet, and transmits the contents to other content reception device connected from the digital input/output terminal 116 to an intra-residential network.

FIG. 25 shows a configuration example of a digital content control table 2500 in a case where the content transmission device 100 refers to the content using descriptor 1200 and the digital copy control descriptor 1300 inserted to the contents which the content transmission device 100 receives via the tuner 101, the cable, and the internet, and records the contents to the recording unit 111.

5. Store Content to Content Transmission Device

An explanation will be given of a content storing processing at the content transmission device 100 in reference to FIG. 15 as follows.

Figure 15:
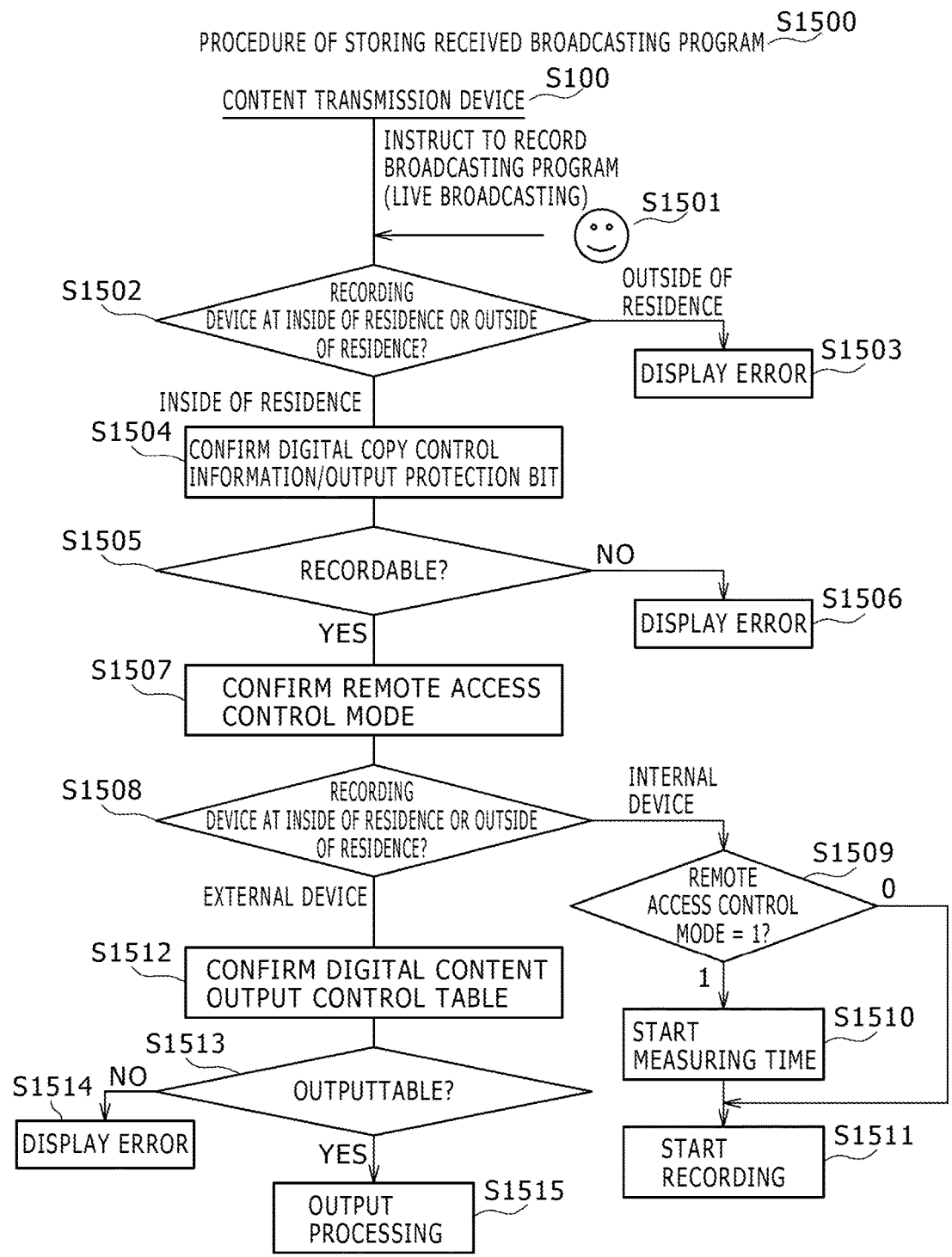
FIG. 15 is an explanatory view showing an example of a storage processing flow in a case where contents received by a content transmission device are recorded.

FIG. 15 shows an example of a flow of a procedure S1500 recording a broadcasting program which the content transmission device 100 receives via the tuner 101, the cable, the internet. An explanation will be given of a procedure of recording the broadcasting program in reference to FIG. 14 and FIG. 15. Incidentally, assume that the contents are digitally recorded to the content recording device.

In a case where a user instructs the content transmission device 100 to record a currently receiving broadcasting program from a program table or a seeing and hearing broadcasting program screen by using a remote controller or a touch panel, the input processing unit 107 of the content transmission device 100 notifies the case to the control unit 115 (S1501).

The control unit 115 of the content transmission device 100 determines whether a record destination of the broadcasting program instructed by the user is currently installed at inside of the residence (S1502). As a result, in a case of a recording device which is not installed at inside of the residence (that is, taken out to outside of residence), the control unit 115 displays the statement that the recording cannot be executed on an error screen and the processings are finished (S1503). Here, at S1501, there is also a method of registering only a device which is currently installed at inside of the residence to a list of candidates of recording devices which the user instructs to select, or a method of not displaying a device registered to the extra-residential device information table 5300 in the list.

In a case of a recording device installed at inside of the residence as a result of determination at S1502, the control unit 115 refers to the digital copy control information 1301 of the digital copy control descriptor 1300 with regard to the contents which the user instructs to record, and the digital copy recording control table 2500 (S1504). The control unit 115 confirms that a value of the digital copy control information 1301 is either of "00: copiable without restriction condition (Copy free)", and "10: copiable only for one generation (Copy one generation)" (S1505). That is, a combination of 2501 through 2502, 2504 through 2506, and 2508 of the digital copy recording control table 2500 means recordable. As a result, in a case of not any value, the control unit 115 displays a statement of unrecordable on the error screen of the display unit 105, and finishes the processings (S1506).

In a case where a result confirmed at S1505 is either value of "00" and "10", the control unit 115 acquires a value of the remote access restriction mode 1206 of the content using descriptor 1200 (S1507). The control unit 115 determines whether the record destination of the broadcasting program instructed by the user is the recording unit 111 in the own device, or a recording device present on the intra-residential network via the digital input/output terminal 114 (S1508).

In a case where the record destination of the broadcasting program is the recording unit 111 in the own device as a result of determination at S1508, the control unit 115 determines whether the value of the remote access restriction mode 1206 acquired at S1507 is "1: remote access not restricted (default)", (S1509). In a case where the value of the remote access restriction mode 1206 is other than "1", the operation proceeds to S1511, and recording to the recording unit 111 is started by the recording/reproducing processing unit 110. In a case where the value of the remote access restriction mode 1206 is "1", the control unit 115 starts measuring time by using the timer 1091 (S1510), thereafter, starts recording the contents to the recording unit 111 by using the recording/reproducing processing unit 110 (S1511).

Here, in a case of recording the contents to the recording unit 111 at S1511, although the contents may not be encrypted by the encryption/decryption processing unit 112 in a combination 2501 of (copy control type information, digital copy control information, output protection bit)=(01, 00, 1) or a combination 2508 of (11, 00, –), in the other combination, the encryption/decryption processing unit 112 encrypts the contents in accordance with a prescribed procedure which is previously determined for respective record media by the other combination.

The recording/reproducing processing unit 110 records the digital copy control descriptor 1300, and the content using descriptor 1200 along with the contents. In that case, in a case of a combination of 2505 and 2506 of the digital copy recording control table 2500, that is, in a case of copiable only for one generation, the recording/reproducing processing unit 110 changes the value of the digital copy control information 1301 to "01: prohibit recopying" to record.

The time started to be measured at S1510 may be used as a determination criteria of whether seeing and hearing by the remote access from outside of a residence is accepted concerning contents (remote access to which is accepted) which is started to be recorded. For example, the control unit 115 of the content transmission device 100 accepts seeing, hearing, and reproducing recorded contents to the content reception device 200 remotely accessing from outside of the residence after measurement time elapses for prescribed time by using the retention acceptable time 1204 of the content using descriptor 1200 or remote access acceptable time newly added to the content using descriptor 1200. The remote access acceptable time may be stored to the recording unit 110 in correspondence with the contents, and may not necessarily be a mode of the content using descriptor 1200. The content transmission device 100 can determine the remote access acceptable time by receiving the remote acceptable time in correspondence with the contents, or based on prescribed information received in correspondence with the contents from the contents provision origins 5a and 5b. Recording as well as seeing, hearing, and reproducing are accepted to the content reception device 300 installed at inside of the residence similar to seeing and hearing by the own device (content transmission device 100).

On the other hand, in the case where the record destination of the broadcasting program is other recording device (for example, content reception device 300) present on the intra-residential network as a result of the determination at S1508, the control unit 115 of the content transmission device 100 refers to the content output control table 1400 of FIG. 14 (S1512), and confirms that the contents can be outputted via the digital input/output terminal 114, and recording is accepted. That is, the control unit 115 of the content transmission device 100 refers to the digital copy control information 301 and the copy control type information 1302 of the digital copy control descriptor 1300, and the output protection bit 1205 of the remote access restriction mode 1206 of the content using descriptor 1200, and determines to which of the following conditions the digital control output corresponds (S1513).

1) Combination 1401 of the digital content output control table 1400
 (a) Copy control type information 1302 "01 (execute DTCP protection)"
 (b) Digital copy control descriptor 1300 "00 (copiable without restriction condition)"
 (c) Output protection bit 1205 "1 (output protection not present)"

2) Combination 1402 of digital content output control table 1400
 (a) Copy control type information 1302 "01 (execute DTCP protection)"
 (b) Digital copy control descriptor 1300 "00 (copiable without restriction condition)"
 (c) Output protection bit 1205 "0 (output protection present)"
 (d) Remote access restriction mode 1206 "1 (remote access not restricted)"

3) Combination 1405 of digital content output control table 1400
 (a) Copy control type information 1302 "01 (execute DTCP protection)"
 (b) Digital copy control descriptor 1300 "10 (copiable only for one generation)"
 (c) Remote access restriction mode 1206 "1 (remote access not restricted)"

4) Combination 1408 of the digital content output control table 1400
 (a) Copy control type information 1302 "11 (not execute DTCP protection)"
 (b) Digital copy control descriptor 1300 "00 (copiable without restriction condition)"

In a case where the determination result does not correspond to any of 1) through 4) described above, the control unit 115 of the transmission device 100 displays an error screen of the display unit 105 of unrecordable statement by the recording/reproducing processing unit 110, and the processings are finished (S1514).

When the determination result corresponds to any of 1) through 4) described above, that is, the contents can be outputted via the digital input/output terminal 114 as a result of the determination at S1513, the control unit 115 starts an output processing of the contents to the content reception device 300 (S1515). Here, although not illustrated, in the output processing, a record request is issued from the content transmission device 100 to the content reception device 300, the device authentication processing S600 described in FIG. 6 is executed as necessary. When the device authentication processing is succeeded, the device authentication processing unit 108 of the content transmission device 100 creates a common key for encrypting contents based on a prescribed algorithm by using an exchange key shared with the content reception device 300, and a packet format described in FIG. 20 is outputted via the communication processing unit 113 and the digital input/output terminal 114 while encrypting the contents by the common key at the encryption/decryption processing unit 112.

In the procedure described above, in a case where the remote access restriction mode 1206 of the content using descriptor 1200 is not present in the contents, a value of the remote access restriction mode 1206 is regarded as "1 (remote access not restricted)".

The following effect is achieved by executing the procedure described above.

1) At S1502/S1503, the content transmission device 100 can prohibit seeing, hearing, and recording of a currently receivable program via the tuner 101 or via the internet 3 (live broadcasting or IPTV broadcasting which is a broadcasting program in real time, VOD service) at the content reception device 200 by remote access from outside of the residence.

2) In a case where the content provision origins (5a, 5b) do not accept remote access to the contents (the value of the remote access restriction mode 1206 is 0), the contents are recorded only to the record media included in the content transmission device 100 which directly receives the contents, and recording of the contents to the other content reception device at inside of the residence including the record media via the digital input/output terminal 114 can be restricted.

In the procedure described above, the processing at S1502 may be executed after S1505. Also, the processing at S1507 may be executed after S1508.

Here, although the procedure described above has explained a case where the user instructs to record the currently receiving broadcasting program, the procedure is applicable also in setting a reservation for recording a broadcasting program, or in executing a reservation for recording the broadcasting program.

6. Seeing and Hearing Contents at Inside of Residence

Figure 16:
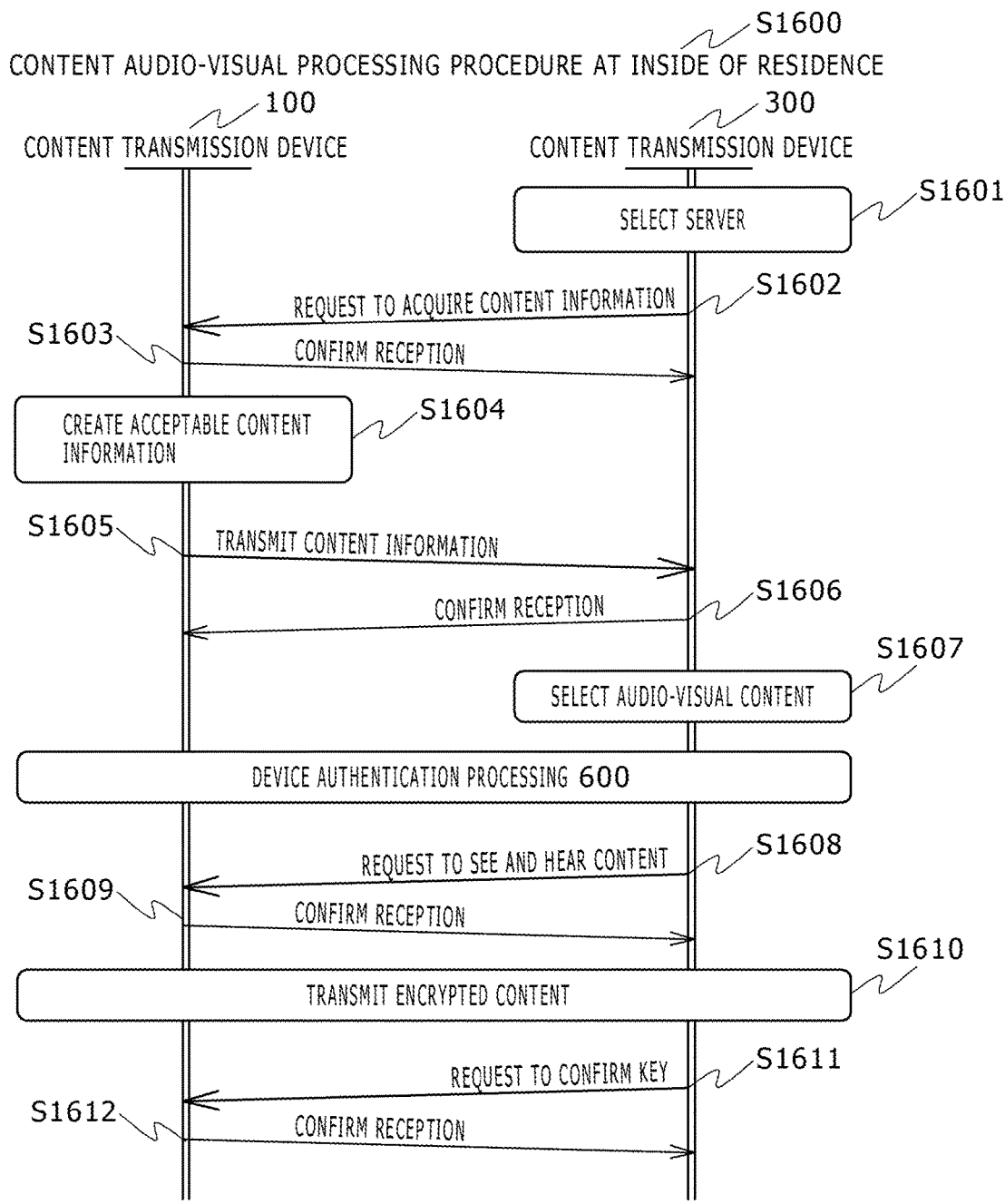
FIG. 16 is an explanatory view showing an example of a content audio-visual processing sequence from inside of a residence executed between a content reception device and a content transmission device.

FIG. 16 shows an example of a processing sequence in a case of seeing and hearing contents stored at the recording unit 111 of the content transmission device 100 by the content reception device 300 at inside of the user residence 1 in the system configuration shown in FIG. 1.

First, when the user instructs seeing and hearing contents by using the input processing unit 107 of the content reception device 300, the control unit 115 of the content reception device 300 displays a list of the content reception devices on the display unit/speaker 105 (screen 1002). The user selects the desired content transmission device 100 on the display screen (S1601).

Here, the content reception device 300 may display the list of the content transmission devices by detecting devices present on the intra-residential network. As a method of detecting the content reception device present on the network, there are, for example, a method of transmitting to multicast a UDP packet including "request for detecting device including content transmission function" to all of the devices on the network, and recognizing the content transmission device by returning a signal only by a device including the function, and a method of recognizing the content reception device by receiving a network participation notice noticed from the content transmission device connected to the network.

The user may input address information of the content transmission device 100 via the input processing unit 107, and the content reception device 300 may access to the content transmission device 100 based on the inputted information without displaying the screen of the list of the content transmission devices.

When the user selects the content transmission device 100 at S1601, the control unit 115 of the content reception device 300 transmits a request for acquiring content information to the content transmission device 100 similarly installed at the user residence 1 via the digital input/output terminal 114 (S1602).

The control unit 115 of the content transmission device 100 transmits confirmation of reception to the content reception device 300 via the communication processing unit 113 (S1603). The control unit 115 of the content transmission device 100 extracts only contents to which the content reception device 300 can access, creates content information by using information (for example, title, date, copy control information, recording time, etc.) concerning a portion or all of the contents (S1604), and transmits the content information to the content reception device 300 (S1605).

Here, at S1604, the control unit 115 of the content transmission device 100 extracts contents which are recorded at the recording unit 111 and can be outputted from the digital input/output terminal 114, contents which are being currently recorded to the recording unit 111 and can be outputted from the digital input/output terminal 114, and contents which are programs that can currently be received via the tuner 101 or the internet 3 and can be outputted from the digital input/output terminal 114.

The control unit 115 of the content reception device 300 transmits confirmation of reception to the content transmission device 100 (S1606), the control unit 115 of the content reception device 300 displays received content information on the display unit/speaker 105 as a list of contents. When the user designates contents which the user intends to see and hear from the list of contents via the input processing unit 107 (S1607), the device authentication processing unit 108 of the content reception device 300 executes the ordinary authentication processing S600 with the device authentication processing unit 108 of the content transmission device 100.

Thereafter, the control unit 115 of the content reception device 300 transmits a request for seeing and hearing desired contents to the content reception device (S1608).

The control unit 115 of the content transmission device 100 transmits confirmation of reception to the request for seeing and hearing contents (S1609) and transmits contents encrypted at the encryption/decryption processing unit 112 by using a common key created by using the exchange key shared at S600 to the content reception device 300 (S1610).

After starting to transmit contents, the device authentication processing unit 108 of the content reception device 300 transmits a request for confirming the key to the content transmission device 100 at an arbitrary timing (S1611). When the device authentication processing unit 108 of the content transmission device 100 receives the request for confirming the key, the device authentication processing unit 108 of the content transmission device 100 transmits confirmation of reception to the content reception device 200 in accordance with a result of the confirmation (S1612).

The device authentication processing unit 108 checks whether an identification ID of the exchange is correct, the device information updating unit 1092 sets the timer 1091 in the device information management unit 109 such that a notice is inputted periodically (for example, at interval of 1 minute or at interval of 10 minutes) and starts the timer 1091. The device authentication processing unit 108 creates the common key for encrypting contents by using the exchange key and sets the common key to the encryption/decryption processing unit 112.

The desired content read from the recording unit 111 is transmitted to the content reception device 300 by the format indicated in FIG. 20 while encrypting the desired contents at the encryption/decryption processing unit 112 (S1610). At S1610, the content transmission device 100 refers to the digital content output control table 1400, and sets E-EMI determined by combinations of the digital copy control descriptor 1300 and the content using descriptor 1200 to E-EMI 200214 in a header portion 20021 of FIG. 20 and outputs the contents. The content transmission device 100 can output the contents from the digital input/output terminal 114, and contents (combinations 1403 and 1406 of the digital content output control table 1400) are prevented from being recorded at the content reception device 300 by setting E-EMI to "No more copies".

Here, the device information updating unit 1092 updates the intra-residential counter value 5204 of the intra-residential device information table 5200 in the device information table 5000 (for example, decrements the counter value) at every time of inputting notice from the timer 1091 in transmitting contents. When the intra-residential counter value 5204 reaches 0, the device information updating unit 1092 deletes information of a corresponding device in the intra-residential device information table 5200.

The device authentication processing unit 108 of the content reception device 300 creates the common key for encrypting contents by using the exchange key shared at S600, and sets the common key to the encryption/decryption processing unit 112. The device authentication processing unit 108 of the content reception device 300 extracts and decodes encrypted contents included to the payload from the format shown in FIG. 20 at the encryption/decryption processing unit 112 with regard to data received via the communication processing unit 113 and the encryption/decryption processing unit 112, and outputs the contents to the display unit/speaker 105 while decoding the encrypted contents by the decoder 104.

7. Seeing and Hearing Contents from Outside of Residence

An explanation will be given of a content audio-visual processing 1800 from outside of a residence in reference to FIG. 18. Also, an explanation will be given of an extra-residential access device authentication processing which is carried out in the procedure of the content audio-visual processing in reference to FIG. 11.

Figure 18:
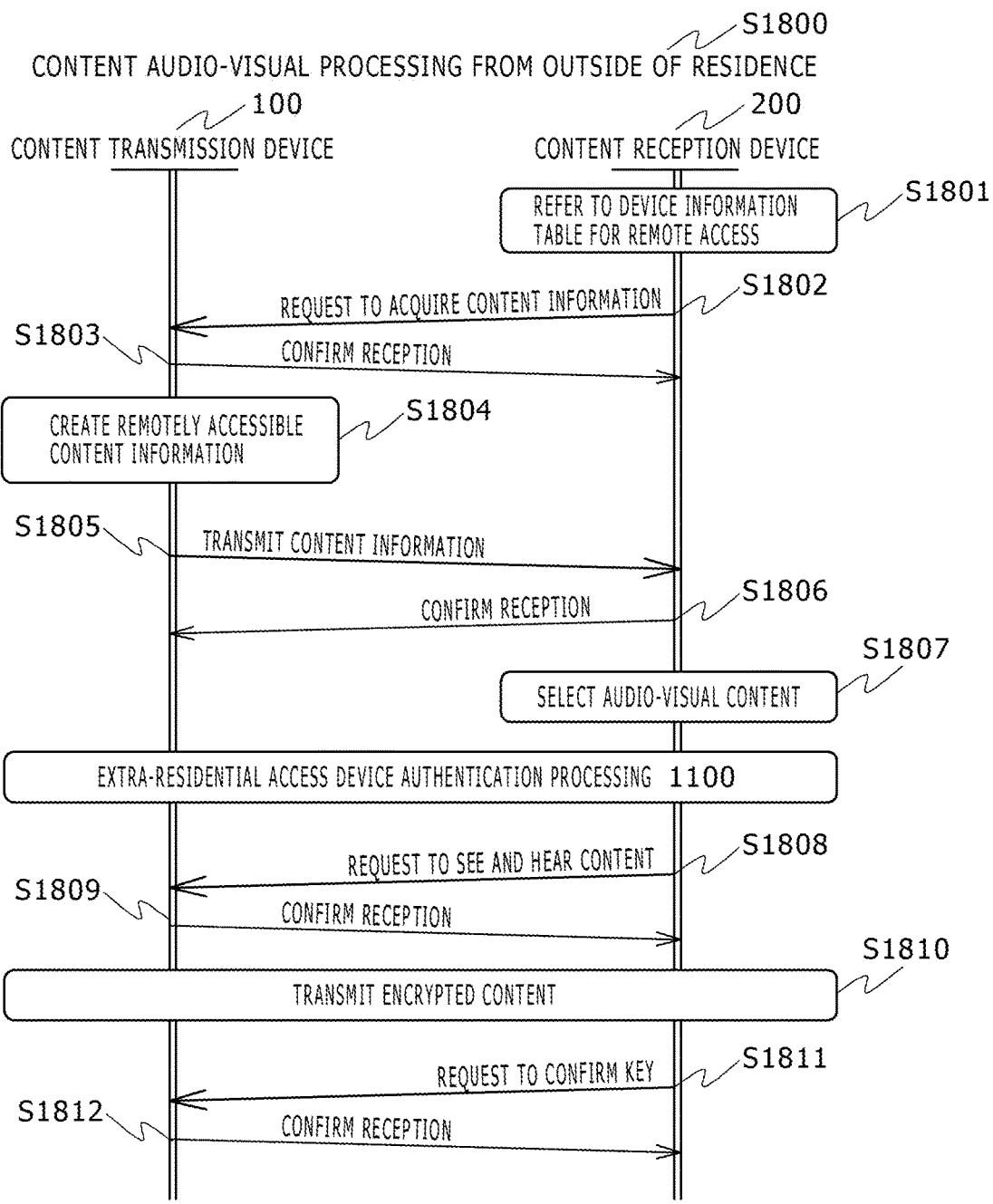
FIG. 18 is an explanatory view showing an example of a content audio-visual processing sequence from outside of a residence executed between a content reception device and a content transmission device.

FIG. 18 shows a processing procedure in a case of taking out the portable terminal (content reception device 200) to outside of the residence and seeing and hearing a broadcasting program inputted from the going out destination 2 to the content reception device 100 via the tuner 101 or contents stored in the recording unit 111 in the system configuration shown in FIG. 1.

First, when a user designates to see and hear contents by using the input processing unit 209 of the content reception device 200, the control unit 115 of the content reception device 200 displays the list of content transmission devices on the display unit/speaker 105. The list of content transmission devices displays the content transmission device 100 which is a device registered in the extra-residential access information table 60000 (S1801).

Here, the content reception device 200 may detect a device present on the network to display in the list of content transmission devices. As a method of detecting the content transmission device present on the network, for example, there is a method of recognizing the content transmission device by transmitting to multicast a UDP packet including "request for detecting a device including a content transmission function" to all of devices on the network and returning answer only by a device including the function, or a method of recognizing a content transmission device by receiving a network participation notice notified from the content transmission device connected to the network.

Next, when the user selects the content transmission device 100 from the list of content transmission devices displayed, the control unit 115 of the content reception device 200 transmits a request for acquiring content information to the content transmission device 100 of the user residence 1 via the internet via the wireless access point 23 and the router 22 of the going out destination 2 from the wireless communication processing unit 203 in reference to address information of the content transmission device 100 registered to the extra-residential access information table 60000 (S1802).

Here, the user may input address information of the content transmission device 100 via the input processing unit 107, and the content reception device 200 may access to the content transmission device 100 based on the inputted information without displaying the list of content transmission devices.

Figure 17:
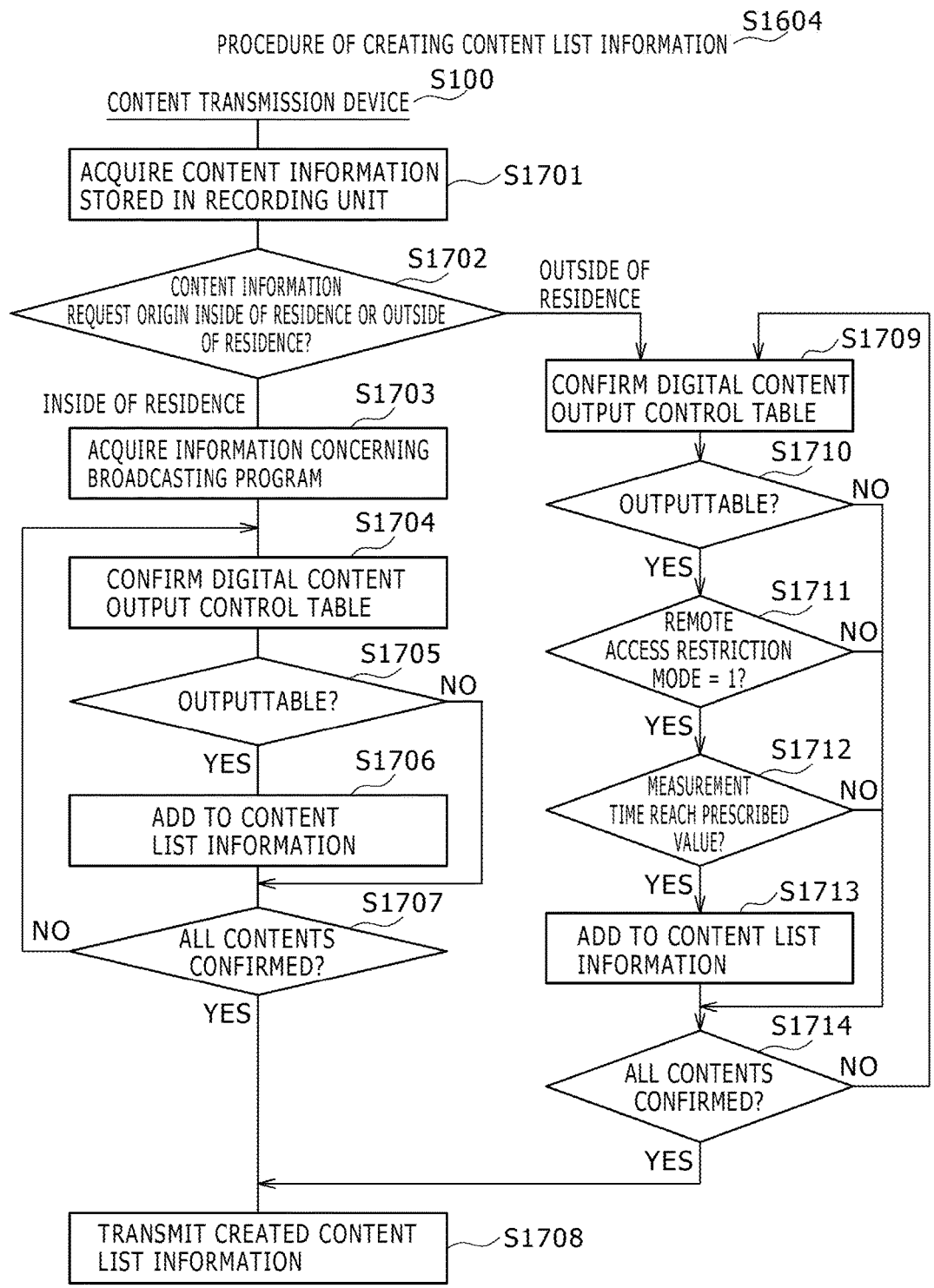
FIG. 17 is an explanatory view showing an example of a creation processing sequence of content list information created by a content transmission device.

The control unit 115 of the content transmission device 100 transmits confirmation of reception to the content reception device 200 via the communication processing unit 113 (S1803), creates content list information (for example, title, date, copy control information, recording time, etc.) concerning a portion or all of contents stored to the recording unit 111 by using a procedure of creating content list information shown in FIG. 17 (S1804), and transmits the information to the content reception device 200 (S1805).

The control unit 115 of the content reception device 200 transmits confirmation of reception to the content transmission device 100 (S1806), and displays received content information on the display unit/speaker 105 as contents list. When the user designates contents intended to see and hear from the contents list via the input processing unit 107 (S1807), the device authentication processing unit 108 of the content reception device 200 executes an extra-residential access device authentication processing 1100 with the device authentication processing unit 108 of the content transmission device 100. The extra-residential access device authentication processing 1100 described later in reference to FIG. 11 is an extra-residential device authentication processing procedure which is executed between the content transmission device 100 and the portable terminal 200 for seeing, hearing or copying, or executing Move copyright protection contents inputted or stored to the content transmission device 100 from the portable terminal (content reception device) 200 present at outside of the residence in the system configuration shown in FIG. 1. The content transmission device 100 and the content reception device 200 authenticate each other by the extra-residential access device authentication processing 1100, and share an exchange key for encrypting contents by the content transmission device 100 and decrypting contents by the content reception device 200 as a result of the authentication.

Thereafter, the control unit 115 of the content reception device 200 transmits a request for seeing and hearing desired contents to the content transmission device 100 (S1808). At this occasion, the request for seeing and hearing contents may be added with ID for identifying the extra-residential exchange key received by the extra-residential access device authentication processing S1100.

The control unit 115 of the content transmission device 100 transmits confirmation of reception to the request for seeing and hearing contents (S1809), and transmits contents encrypted by the encryption/decryption processing unit 112 by using the key shared at S1100 to the content reception device 200. In a case where a value of the extra-residential simultaneous access number 5322 reaches a value of the extra-residential simultaneous access maximum number 5106 by using the extra-residential device information table 5300 shown in FIG. 5, a response rejecting the request can be returned.

After starting to transmit contents, the device authentication processing unit 108 of the content reception device 200 transmits a request for confirming the key to the content transmission device 100 at an arbitrary timing (S1811). When the device authentication processing unit 108 of the content transmission device 100 receives the request for confirming the key, the device authentication processing unit 108 of the content transmission device 100 transmits confirmation of reception to the content reception device 200 in accordance with a result of the confirmation (S1812).

The device authentication processing unit 108 checks whether an identification ID of the extra-residential exchange key is correct, the device information updating unit 1092 sets the timer 1091 in the device information management unit 109 to input notice periodically (for example, at an interval of one minute or an interval of 10 minutes) so as to input a notice and starts the timer 1091. The device authentication processing unit 108 creates a common key for encrypting contents by using the extra-residential exchange key, and sets the common key to the encryption/decryption processing unit 112.

The device authentication processing unit 108 transmits desired contents read from the recording unit 111 to the content reception device 200 by the format shown in FIG. 20 while encrypting the contents by the encryption/decryption processing unit 112 (S1810). Here, the device information updating unit 1092 updates the extra-residential counter value 5207 (for example, decrements the counter value) in the device information table 5000 at each time of inputting notice from the timer 1091 in transmitting contents. When the extra-residential counter value 5206 reaches 0, the device information updating unit 1092 deletes information of corresponding device in the extra-residential device information table 5300.

The device authentication processing unit 108 of the content reception device 200 creates the common key for decrypting contents by using the extra-residential exchange key, and sets the common key to the encryption/decryption processing unit 112. The device authentication processing unit 108 of the content reception device 200 extracts to decrypt encrypted contents included in the payload from the format shown in FIG. 20 by the encryption/decryption processing unit 112 and outputs the contents to the display unit/speaker 105 while decoding the contents by the decoder 104 concerning data received via the wireless communication processing unit 203 and the wireless encryption/decryption processing unit 202.

As described above, contents can be transmitted from the content transmission device at inside of the residence to the content reception device at outside of the residence when the extra-residential access device authentication processing 1100 which will be described later in reference to FIG. 11 is executed and succeeded only in a case where the extra-residential access device registration processing S700 is executed between the content transmission device and the content reception device previously at inside of the residence and the content reception device which has succeeded in the authentication processing is taken out to outside of the residence.

7.1 Extra-Residential Access Device Authentication Processing

Here, a description will be given of the extra-residential access device authentication processing.

FIG. 11 is a diagram showing an example of a processing sequence of the extra-residential access device authentication processing 1100 executed between the content transmission device 100 and the portable terminal 200 for seeing and hearing or copying, executing Move the copyright protection contents inputted or stored to the content transmission device 100 from the portable terminal (content reception device) 200 present at outside of the residence in the system configuration shown in FIG. 1. Assume that the content reception device 200 is present at outside of the residence when the procedure is executed. Also, assume that the portable terminal 200 previously executes the extra-residential access device registration processing S700 with the content transmission device 100 by using the procedures of FIG. 7 and FIG. 9, and the portable terminal 200 has registered to the extra-residential device information table 5300 of the content transmission device 100.

Here, the content transmission device 100 and the content reception device 200 do not monitor TTL of a received packet. The content transmission device 100 and the content reception device 200 set the extra-residential transmission TTL set value 1912 of the TTL table 1910 such that TTL of a transmitted packet is not equal to or less than the intra-residential restriction TTL value 1911 of the TTL table 1910 and a packet can reach the user residence 1 from the going out destination 2 via the internet. The extra-residential transmission TTL set value 1912 is made to be a value larger than the intra-residential restriction TTL value 1911.

First, the device authentication processing unit 108 of the content reception device 200 creates an extra-residential authentication request. The extra-residential authentication request is attached with information inherent to the device including the device ID, and a deed for the information inherent to the device to transmit to the content transmission device 100 via the wireless communication processing unit 203 (S1101).

When the device authentication processing unit 108 of the content transmission device 100 receives the extra-residential authentication request, the device authentication processing unit 108 of the content transmission device 100 confirms that the device ID of the content reception device 200 is registered to the extra-residential device information table 5300 managed in the device information management unit 109, and a value of the extra-residential simultaneous access number 5322 of the extra-residential device information table 5300 is smaller than a value of the extra-residential simultaneous access maximum number 5106 of the definition table 5100, and thereafter transmits confirmation of reception thereof to the content reception device 200 (S1102).

In a case where the device ID of the content reception device 200 is not registered in the extra-residential device information table 5300, or in a case where the value of the extra-residential simultaneous access number 5322 of the extra-residential device information table 5300 is the same as the value of the extra-residential simultaneous access maximum number 5106 of the definition table 5100, the content transmission device 100 interrupts processings thereafter.

Next, the device authentication processing unit 108 of the transmission device 100 creates an extra-residential authentication request from the own side, and attaches information inherent to the content transmission device 100 and a deed for the information inherent to the device to transmit to the content reception device 200 via the communication processing unit 113 similar to the case of the content reception device 200 (S1103).

The device authentication processing unit 108 of the content reception device 200 receives the extra-residential authentication request, and transmits confirmation of reception thereof to the content transmission device 100 (S1104).

Next, the device authentication processing unit 108 of the content transmission device 100 verifies respective information received by the extra-residential authentication request, and transmits an extra-residential authentication response attached with parameter necessary for creating key information to the content reception device 200 (S1105).

The device authentication processing unit 108 of the content reception device 200 receives the extra-residential authentication response and transmits confirmation of reception thereof to the content transmission device 100 (S1106), thereafter, creates an extra-residential authentication response from the own side, transmits an extra-residential authentication response attached with parameters necessary for creating the key information to the content transmission device 100 similar to the case of the content transmission device (S1107), and creates an extra-residential authentication key common to the content transmission device 100 by using necessary parameters.

The device authentication processing unit 108 of the content transmission device 100 receives the extra-residential authentication response, transmits confirmation of reception thereof to the content reception device 200, and creates the authentication key common to the content reception device 200 by using necessary parameters similar to the content reception device (S1108).

In the procedure up to this point, the device authentication processing unit 108 of the content transmission device 100 and the device authentication processing unit 108 of the content reception device 200 create and share the authentication key common to each other.

Next, the content reception device 200 is registered to the extra-residential device information table 5300, it is confirmed that the extra-residential counter value 5306 of the content reception device 200 is not 0 (S1109), thereafter, an extra-residential exchange key used in encrypting contents is created, the extra-residential exchange key is encrypted by using the extra-residential authentication key, and transmitted to the content reception device 200 along with ID for identifying the extra-residential exchange key (S1110).

The device authentication processing unit 108 of the content reception device 200 decrypts the extra-residential exchange key transmitted from the content transmission device 100 by using the extra-residential authentication key, and transmits confirmation of reception (S1111).

When the device authentication processing unit 108 of the content transmission device 100 receives the confirmation of reception, the device authentication processing unit 108 of the content transmission device 100 updates information concerning the content reception device 200 in the extra-residential device information table 5300 in the device information management unit 109 (S1112). Specifically, the device authentication processing unit 108 of the content transmission device 100 sets the extra-residential exchange key created at S1111 to the extra-residential exchange key 5304, and updates the transmission status 5305 from "stop" to "accessing".

The device authentication processing unit 108 of the content reception device 200 sets the extra-residential exchange key decrypted at S1111 to the extra-residential exchange key 60004 of the extra-residential access information table 60000 (S1113).

The procedure described above explains the device authentication processing executed between the content transmission device 100 and the content reception device 200 in a case of transmitting contents to outside of the residence.

It can be confirmed that the devices are devices normally qualified between the devices, and a key used for encryption/decryption of contents in transmitting contents to outside of the residence can be shared by executing the procedure described above.

8. Creation of Content List Information

FIG. 17 shows an example of a processing sequence of creating contents list information (contents list which can be provided to the content reception device 300 in contents stored to the recording unit 111) which the content transmission device 100 provides to the content reception device 300 at S1604 of the content audio-visual processing procedure at inside of the residence shown in FIG. 16 and S1804 of the content audio-visual processing procedure from outside of the residence shown in FIG. 18.

When the content information acquiring request is received from the content reception device 300 at S1602 in FIG. 16 or at S1802 in FIG. 16, the control unit 115 of the transmission device 100 acquires information concerning contents stored to the recording unit 111, for example, name, broadcasting station/channel name, recording time, recording mode, image/voice format, digital copy control descriptor, content using descriptor, detailed information or the like (S1701). Here, the content information includes contents which are being recorded currently at the recording unit 111.

Next, the control unit 115 of the content transmission device 100 determines whether the content reception device issuing the contents information acquiring request makes an access from inside of the residence, or makes an access from outside of the residence (S1702). Here, as a method of detecting the content reception device present on the intra-residential network, for example, there is a method of recognizing the content reception device by transmitting to multicast the UDP packet including "request for detecting device" to all of devices on the network, and returning the response only by the device including the function.

In a case where the content reception device 300 is installed at inside of the residence as a result of determination at S1702, the content transmission device 100 acquires information concerning a program which can be seen and heard in real time by currently receiving the program via the tuner 101 or via the Internet 3, for example, program name, broadcasting station/channel name, broadcasting time, image/voice format, digital copy control descriptor, content using descriptor, detailed information or the like (S1703). The content transmission device 100 confirms a combination of the digital content output control table 1400 by referring to the copy control descriptor 1300 and the content using descriptor 1200 for respective contents by using information concerning contents stored to the recording unit 111 acquired at S1701 and information concerning acquired contents currently broadcasting acquired at S1703 (S1704). The content transmission device 100 determines whether the contents can be outputted via the digital input/output terminal 114 from the combination of values of the digital control descriptor 1300 and the content using descriptor 1200. Specifically, the content transmission device 100 determines whether the values of the digital copy control descriptor 1300 and the content using descriptor 1200 correspond to combinations 1401 through 1408 of the digital content output control table 1400 (S1705).

In a case where the values do not correspond to the combinations as a result of the determination at S1705, the operation proceeds to S1707. In a case where the values correspond to the combinations, information concerning the contents is added to the contents list information transmitted to the content reception device 300 (S1706). When it can be confirmed that all the contents have been confirmed (S1707), the content list information created at S1605 of FIG. 16 is transmitted to the content reception device 300 (S1708). As described above, contents which are present on the network at inside of the residence and can be outputted to the content reception device 300 are only contents corresponding to the combinations 1401 through 1408 of the digital content output control table 1400.

On the other hand, in a case where the content reception device makes remote access from outside of the residence as a result of the determination at S1702 (for example, portable terminal 200), the combination of the digital content output control table 1400 is confirmed by referring to the digital control descriptor 1300 and the content using descriptor 1200 for respective contents by using information concerning contents stored to the recording unit 111 acquired at S1701 (S1709). It is determined whether contents can be outputted via the digital input/output terminal 114 by the combination of the digital copy control descriptor 1300 and the content using descriptor 1200. Specifically, it is determined whether the values of the digital copy control descriptor 1300 and the content using descriptor 1200 correspond to combinations 1401 through 1408 of the digital content output control table 1400 (S1710).

In a case where the values do not correspond to the combination as a result of the determination of S1710, the operation proceeds to S1714. In a case where the values correspond to the combination, it is determined whether a value of the remote access restriction mode 1206 is "1 (remote access acceptable)" (S1711).

In a case where the value of the remote access restriction mode 1206 is "other than 1" as a result of the determination at S1711, the operation proceeds to S1714. In a case where the value of the remote access restriction mode 1206 is "1", it is determined whether time of starting measurement reaches a prescribed value by using the timer 1091 at S1510 of FIG. 15 (S1712). The prescribed value indicates, for example, the retention acceptable time 1204 of the content using descriptor 1200 or "elapse time until enabling remote access" previously set to the remote access acceptable time stored to the recording unit 110 in correspondence with contents.

In a case where the time has not reached the prescribed value as a result of the determination at S1712 (that is, remote access is not enabled), the operation proceeds to S1714. In a case where the time reaches the prescribed value, information concerning the contents is added to the contents list information transmitted to the portable terminal 200 (S1713). When it can be confirmed that all of the contents have been confirmed (S1714), the contents list information created at S1605 of FIG. 16 is transmitted to the portable terminal 200 (S1708).

The following effect is achieved by executing the procedure described above.

1) At S1702/S1703, it can be prohibited to see, hear, or reproduce a program which the content transmission device 100 can currently receive via the tuner 101 or via the internet 3 (live broadcasting or IPTV broadcasting seeing and hearing broadcasting program in real time, VOD service) by the content reception device 200 by remote access from outside of the residence.

2) At S1712, in a case where the content provision origins (5a, 5b) do not accept remote access to contents recorded at the recording unit 111 of the content transmission device 100 (the value of the remote access restriction mode 1206 is 0), seeing, hearing and reproducing by the content reception device 200 by remote access from outside of the residence can be prohibited.

9. Packet Filtering and Packet Reception Using TTL

An explanation will be given of a packet filtering processing and a packet reception processing using TTL in reference to FIG. 19 through FIG. 24 as follows.

FIG. 19 shows a configuration example of threshold information 1900 storing various thresholds and set values which the device authentication processing unit 108 uses. The threshold information 1900 is configured by a TTL table 1910 and an intra-residential confirmation threshold table 1920.

The TTL table 1910 is configured by an intra-residential restriction TTL value 1911 and an extra-residential transmission TTL set value 1912.

The intra-residential restriction TTL value 1911 indicates a value of TTL set to a packet transmitted by the content transmission device and the content reception device in an authentication processing when the content transmission device transmits contents to the content reception device in the same residence, and when an extra-residential access device is registered.

A value of the intra-residential restriction TTL value 1911 is used also as a threshold for determining whether the received packet is a packet transmitted from outside of the residence, in the authentication processing when the content transmission device transmits contents to the content reception device in the same residence, and when a device is registered for an extra-residential access.

The extra-residential transmission TTL set value 1912 is used as a value set to a packet which the content transmission device and the content reception device transmit in the extra-residential access device authentication. The extra-residential transmission TTL set value 1912 is made to be a value larger than the intra-residential restriction TTL value 1911.

Here, TTL is a value representing an effective period of a packet, and the value is decremented by 1 at every time of passing a packet through a router or the like by once. A packet TTL of which becomes 0 is abandoned at the time point. Therefore, packet transfer to outside of the residence can be prevented by setting TTL to a sufficiently small value.

The intra-residential confirmation threshold table 1920 is configured by an intra-residential confirmation time out value (T) 1921 and an extra-residential registration intra-residential confirmation time out value (T') 8202.

The intra-residential confirmation time out value (T) 1921 is used for a determination for confirming that the content reception device is present in the same residence in the device authentication processing when the content transmission device transmits contents to the content reception device.

The extra-residential registration intra-residential confirmation time out value (T') 8202 is used for a determination for confirming that the content reception device to be registered is present in the same residence in an extra-residential access device registration processing. An intra-residential confirmation can be carried out more strictly concerning a device for executing an extra-residential access in an authentication processing by setting the extra-residential registration intra-residential confirmation time out value (T') 8202 smaller than the intra-residential confirmation time out value (T) 1921.

FIG. 20 shows a configuration example of a transmission data in a case of transmitting contents by using HTTP protocol in the encrypted content transmission processing S1610 of the content audio-visual processing procedure at inside of the residence S1600, and the encrypted content transmission processing S1810 of the content audio-visual processing procedure S1800 from outside of residence S1800. Here, although TCP is used as a transport layer protocol, TCP header is omitted.

A transmission data 2000 in a case of transmitting contents by using the HTTP protocol is configured by an HTTP header 2001 and a content transmission packet 2002.

The content transmission packet 2002 is configured by a header portion 20021 and a payload portion 20022.

The header portion 20021 is configured by Type 200211, a reservation region (Reserved) 200212, an encryption system (C_A) 200213, an encryption mode (E-EMI) 200214, an exchange key label (Exchange_Key_Label) 200215, copy control information (PCP-UR) 200216, a random number value (SNc) 200217, and a payload size (Byte Length of Payload) 200218.

Type 200211 sets a fixed value for identifying a kind of the content transmission packet 2002.

The reservation region (Reserved) 200212 is a reservation region and 0 is set thereto.

The encryption system (C_A) 200213 indicates an encryption system of the payload portion. For example, the encryption system explicitly indicates that encryption is executed by AES having a key length of 128 bits.

The encryption mode (E-EMI) 200214 indicates an encryption mode of the payload portion, and is used for calculating a content key in combination with the copy control information (PCP-UR) 200216, and the random number value (SNc) 20017.

The exchange key label (Exchange_Key_Label) 200215 sets a label of specifying a key exchanged in the authentication procedure 600.

The copy control information (PCP-UR) 200216 indicates copy control information of the payload portion, and is configured by a copy control information mode (UR Mode) representing a kind of the copy control information, a content type (Content Type) representing a kind of the payload portion, APS for executing an analog output restriction, and ICT for executing resolution restriction.

The payload size (Byte Length of Content) 200218 sets a size of the payload portion 17022 of the payload portion 17022 of the content transmission packet 1702. The payload portion 17022 is configured by encrypted contents.

For example, also in a case of transmitting contents by using RTP protocol, contents can be transmitted by a configuration similar to that of FIG. 20 by substituting the HTTP header 2001 for an RTP header. Or, the copy control information can firmly be transmitted when both of the RTP header and the content transmission packet 2002 are stored for each RTP packet.

FIG. 21 shows a configuration example of a packet monitoring table 2100 used in a case of executing filtering by TTL is executed for each port number at the communication processing unit of the content transmission device.

The packet monitoring table 2100 is configured by ID 2101, a port number 2102, and a TTL restriction 2103. ID 2101 indicates a registration number of the table. The port number 2102 indicates a destination port number of a received packet of TCP or UDP of a monitoring object.

The TTL restriction 2103 indicates an upper limit value of TTL in a filtering processing applied to a packet received by a port set to the port number 2102. The value takes a value from 0 to 255, in a case of 0, the TTL restriction, that is, the filtering is not executed. For example, a record 2111 in which a value of ID 2101 in FIG. 21 is 1 indicates that the received packet is abandoned in a case where the TTL value of the received packet is larger than 3 in a case where the port number is 53219.

A record 2112 in which the value of ID 2101 is 2 indicates that filtering by the received packet TTL value is not executed in a case where the destination port number of the received packet is 53220. Each record of the table may statically be registered or dynamically registered when used.

Figure 22:
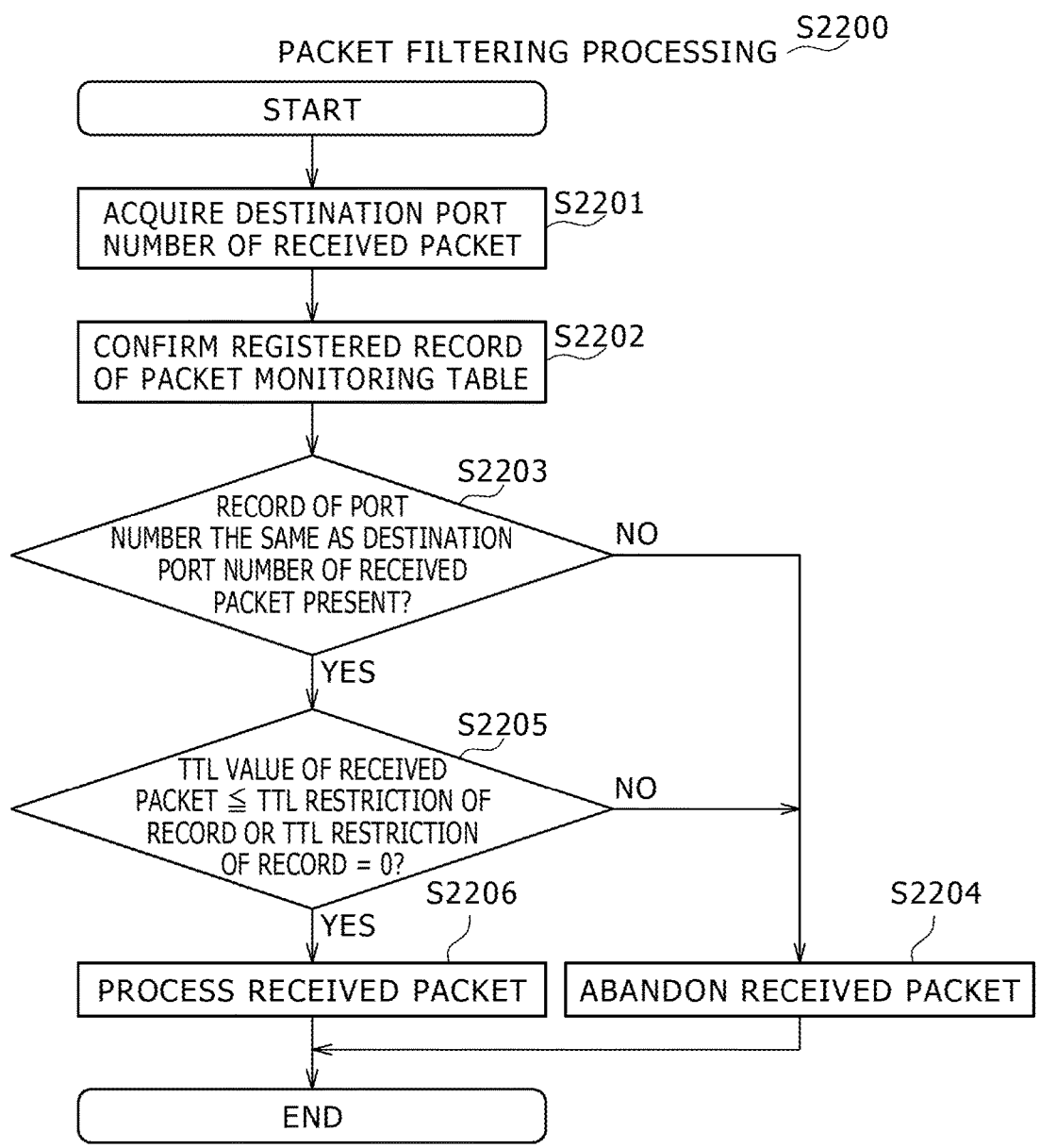
FIG. 22 shows an example of a procedure of a packet filtering processing S2200 in a case where filtering by TTL is executed for respective port numbers.

FIG. 22 shows an example of a flow of a packet filtering processing S2200 in a case of executing filtering by TTL for each port number.

First, the communication processing unit 113 of the content transmission device 100 acquires a destination port number of a received packet (S2201).

Next, the communication processing unit 113 confirms a registered record of the packet monitoring table 2100 (S2202). In a case where a record of port number 2102 the same as the destination port number of the received packet is not present at the packet monitoring table 2100 (No of S2203), the communication processing unit 113 abandons the received packet (S2204), and finishes the processing.

On the other hand, in a case where the record of the port number 2102 the same as the destination port number of the received packet is present in the packet monitoring table 2100 (Yes of S2203), the communication processing unit 113 compares a TTL value of the received packet and a value of the TTL restriction 2103 set to the record of the port number 2102 the same as the port number of the received packet, abandons the received packet (S2204) and finishes the processing in a case where the TTL value of the received packet is larger than the TTL restriction 2103 of the record (No of S2205).

On the other hand, in a case where the TTL value of the received packet is equal to or less than the TTL restriction 2103 of the record or the value of the TTL restriction 2103 of the record is 0 (Yes of S2205), the communication processing unit 113 processes the received packet (S2206) and finishes the processing.

As described above, ports are classified for access at inside of the residence and access from outside of the residence by setting the restriction value of TTL for each port by using the packet monitoring table and executing filtering of packet in accordance with a set content, and the filtering processing of the packet in accordance with each port can be executed. That is, in access from inside of the residence, filtering can be carried out by monitoring TTL, and in accessing from outside of the residence, filtering can be prevented from being executed.

FIG. 23 shows a configuration example of a connection management table 2300 used in a case where the device authentication processing unit 108 of the content transmission device 100 executes filtering of a device authentication processing packet by TTL for each TCP connection.

The connection management table 2300 is configured by ID 2301, a socket descriptor 2302, and TTL restriction 2303. ID 2301 indicates a registration number of the table. The socket descriptor 2302 is an identifier for uniquely identifying TCP connection at the content transmission device.

The TTL restriction 2303 indicates an upper limit value of TTL in the filtering processing which is applied to the device authentication processing packet received on the TCP connection indicated by the socket descriptor 2302. The value takes a value from 0 to 255, a case of 0 indicates TTL restriction, that is, that the filtering is not executed. For example, a record 9211 in which a value of ID 2301 is 1 in FIG. 23 indicates that the device authentication processing packet is abandoned in a case where the TTL value of the received packet is larger than 3 in a case of a connection in which the value of the socket descriptor 2302 is 2.

A record 2312 in which the value of ID 2301 is 2 indicates that filtering by a TTL value of the received device authentication processing packet is not executed in a case of a connection in which the value of the socket descriptor 2302 is 4. A record 9213 in which the value of ID 2301 is 3 indicates that a connection is established, the record is only newly registered, and TTL restriction 2303 is not set yet in a case of a connection in which the value of the socket descriptor 2302 is 6. That is, the record is registered to the table at a time point of establishing the connection.

Figure 24:
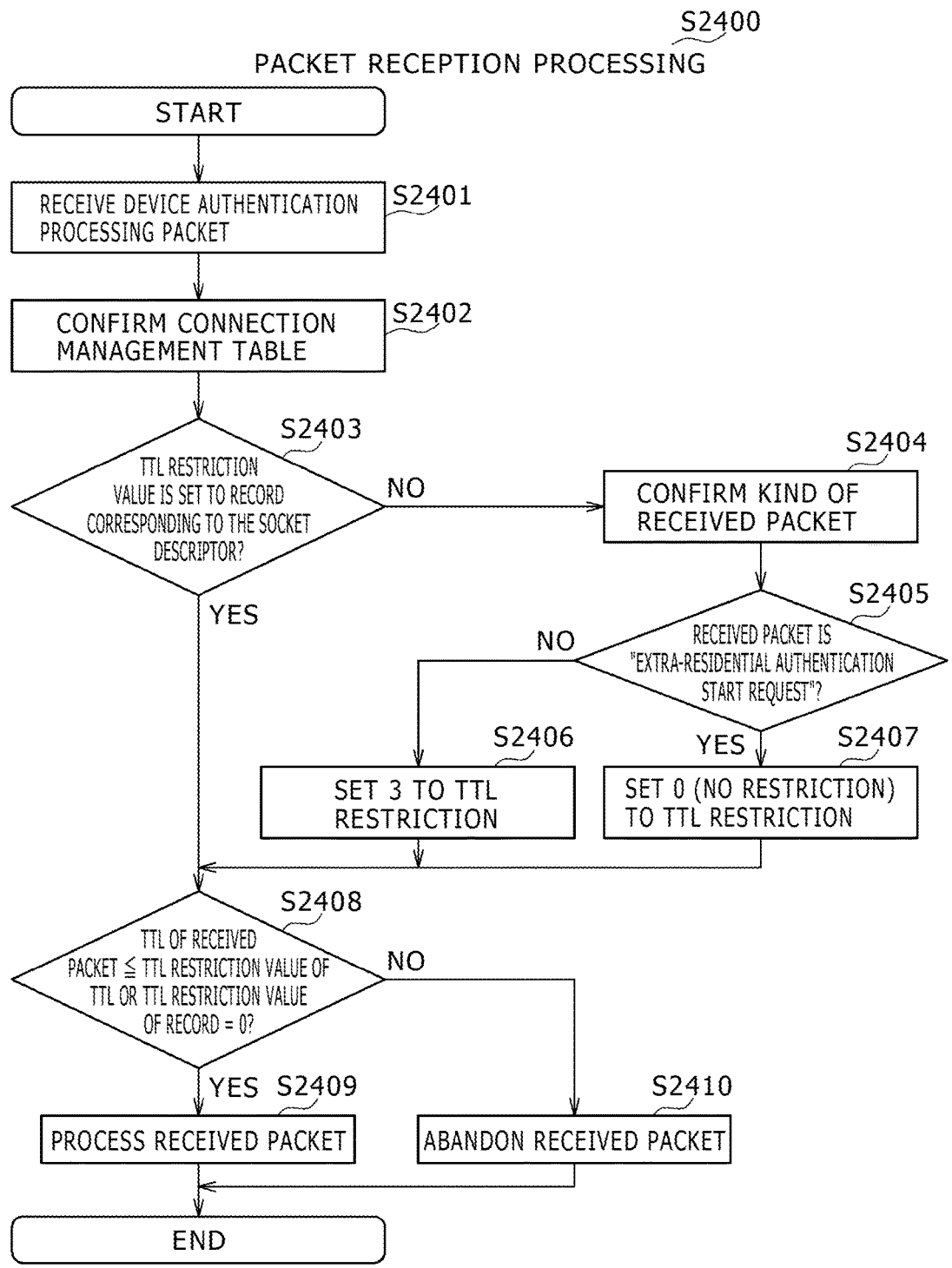
FIG. 24 shows an example of a procedure of a packet reception processing S22400 in a case where filtering of a packet for a device authentication processing is executed by using a connection management table.

FIG. 24 shows an example of a procedure of a packet reception processing S2400 in a case where filtering of a device authentication processing packet is executed by using the connection management table.

First, the device authentication processing unit 108 of the content transmission device 100 receives a device authentication processing packet via the communication processing unit 113 (S2401). Next, the device authentication processing unit 108 confirms the connection management table (S2402), and confirms whether the TTL restriction value is registered to a record in correspondence with a value of the socket descriptor receiving the received packet (S2403).

In a case where the TTL restriction value is set to the record (Yes of S2403), the device authentication processing unit 208 confirms whether the TTL value of the received packet is equal to or less than the TTL restriction value, or the set TTL restriction value is 0 (S2408). In a case where the TTL value of the received packet is equal to or less than the set TTL restriction value, or the set TTL restriction value is 0 (Yes of S2408), the device authentication processing unit 108 of the content transmission device 100 processes the received packet in accordance with the kind of packet (S2409), and finishes the processing.

On the other hand, in a case where the TTL value of the received packet is larger than the set TTL restriction value (No of S2408), the device authentication processing unit 108 abandons the received packet (S2410) and finishes the processing.

On the other hand, in a case where the TTL restriction value is not set to the record yet (No of S2403), the device authentication processing unit 108 of the content transmission device 100 confirms the kind of the received packet (S2404). In a case where the received packet is an extra-residential authentication start request issued at S1101 of FIG. 11 (Yes of S2405), the device authentication processing unit 108 sets 0 to the TTL restriction 2303 of the record of the connection management table 2300 (S2407).

On the other hand, in a case where the received packet is not the extra-residential authentication start request issued at S1101 of FIG. 11 (No of S2405), the device authentication processing unit 108 sets 3 to the TTL restriction 2303 of the record of the connection management table 2300 (S2406), and executes processings at S2408 and thereafter.

As described above, the restriction by TTL can be executed respectively in accordance with the access from inside of the residence and the access from the outside of the residence by setting the TTL restriction value in accordance with the kind of the device authentication processing packet which is received first by using the connection management table. That is, filtering of the device authentication processing packet received by monitoring TTL is made to be able to be executed in accessing from inside of the residence, and filtering of the device authentication processing packet received is made to be not able to execute in accessing from outside of the residence.

Monitoring of TTL can be stopped and the TTL value set to the transmitted device authentication processing packet can be changed in the processings thereafter at the content transmission device by changing the TTL restriction for each connection and notifying explicitly the extra-residential authentication start by transmitting the extra-residential authentication start request in starting the extra-residential authentication by the procedure described above. As a result, authentication of a device and sharing of the authentication key can be executed by using the authentication request and the authentication response used at the ordinary authentication processing S600.

Although according to the embodiment, the kind of the received packet is used for presence or absence of the restriction by TTL, presence or absence of the restriction may be determined by the port number of transmitting and receiving the packet by using the table and the procedure shown in FIG. 21 and FIG. 22. In a case where presence or absence of the restriction is determined by the port number, it is not necessary to transmit and receive the extra-residential authentication start request, and therefore, the authentication processing can swiftly be started.

As described above, according to the embodiment, the content provision origin can restrict use by remote access to the delivered contents by installing the remote access restriction mode 1206 to the content using descriptor 1200.

In a case where the value of the remote access restriction mode 1206 of contents received from the content provision origin is "restrict remote access (unacceptable)", an illegal remote access to contents can easily be restricted by enabling recording only by record media included in the device receiving the contents and prohibiting recording to other recording device.

In a case where a value of the remote access restriction mode 1206 of contents stored to record media is "remote access is restricted (unacceptable)", an audio-visual operation is enabled only for a reproducing device connected to a network at inside of the residence, and the contents are not outputted to a reproducing device which is remotely accessed from outside of the residence. Thereby, use by remote access set by the content provision origin can be restricted also with regard to stored contents.

In a case where a value of the remote access restriction mode 1206 of contents received from the content provision origin is "remote access is not restricted (acceptable)", time measurement is started by using a timer simultaneously with starting to record to record media. Remote access to the contents is accepted only after the measurement time elapses for prescribed time. Thereby, remote access to contents of a live broadcasting program which is seen and heard in real time can easily be restricted.

As described above, according to the embodiment, in a case where encrypted contents are transmitted to a content reception device, in a case where the contents are a live broadcasting or VOD (Video On Demand), the contents are not delivered to a content reception device at outside of a residence. It is determined whether remote access to the contents is accepted by referring to an identifier for identifying remote access possible/impossible added to the content provision origin (broadcasting station or content delivery provider, etc.). As a result, concerning contents remote access of which is not accepted, delivery is accepted to "audio-visual operation for content reception device at inside of a residence", and "recoding to record media included in own device (that is, content transmission device) along with the identifier" is accepted. On the other hand, in a case where the contents are recorded to record media, the identifier added to the contents is referred, and contents remote access of which is accepted is delivered to a content reception at outside of the residence. Contents remote access of which is not accepted is made to be able to be delivered only to a reception device at inside of a residence. Contents at inside of a residence can be seen and heard when a content reception device executes a device registration processing for an extra-residential access previously with a content transmission device at inside of a residence, and the content reception device succeeding the processing executes a device authentication processing exclusive for outside of the residence from the outside of the residence. Thereby, a normal user can see and hear contents at inside of the residence from outside of the residence without exceeding a range of personal use, and a convenience of the user is improved.

Second Embodiment

Next, an explanation will be given of second embodiment of the present invention.

Figure 26:
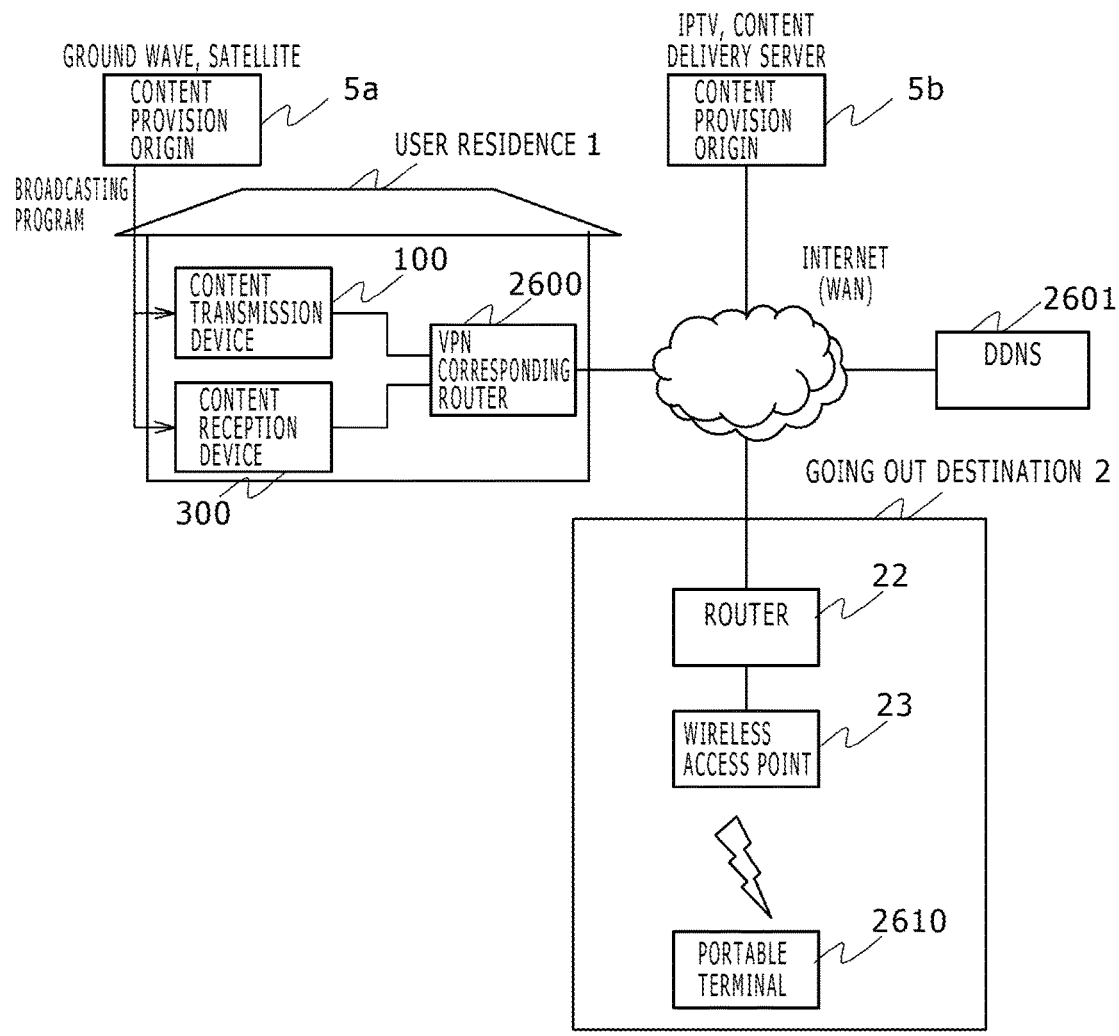
FIG. 26 is an explanatory view showing a configuration example of a system.

FIG. 26 shows a system configuration example of the embodiment. A difference from first embodiment resides in that at the user residence 1, the content transmission device 100 and the content reception device 300 explained in first embodiment, are connected to a VPN (Virtual Private Network) corresponding router 2600 by a cable of wired LAN and a change point accompanied therewith explained below. A system configuration or processing which is not particularly explained below is common to that of first embodiment so far as not conflicting with a technology of second embodiment.

The VPN corresponding router 2600 is connected to the internet 3 via a modem or an optical/electrical converter. The content transmission device 100 and the content reception device 300 can receive contents delivered from the content provision origins (5a, 5b) via the antenna 10 or via the internet 3 similar to first embodiment. At the going out destination 2 of the user, the portable terminal 300 of the user can be communicated with the wireless access point 23 and can be connected to the internet 3 via the router 22 similar to first embodiment.

Here, the VPN corresponding router 2600 is a configuration device for realizing a VPN function enabling communication between key points remote from each other or an access from PC at outside of a company to a server at inside of the company by using a general communication network of the internet or the like in place of an exclusive communication line. Although VPN respectively uses a security protocol of IPsec, SSL (Secure Sockets Layer)/TLS (Transport Layer Security), PPTP (Point to Point Tunneling Protocol), or L2TP (Layer 2 Tunneling Protocol) in accordance with a mode of use, in the present embodiment, VPN is not limited to use any of these.

The VPN corresponding router 2600 is allocated with a global IP address (used on WAN side) from ISP (Internet Services Provider) to which a user of the user residence 1 subscribes. The VPN corresponding router 2600 allocates private IP addresses to the content transmission device 100 and the content reception device 300 of the user residence 1 by using a DHCP server function provided to the VPN corresponding router 2600 per se similar to first embodiment. In a case of accessing to the content transmission device 100 or the content reception device 300 of the user residence 1 from a portable terminal 2620, the global IP address is used. It is general to allocate the IP address dynamically by ISP, and therefore, there is a possibility of being updated by ISP. Hence, the VPN corresponding router includes a DDNS client function for registering to DDNS server at each time of updating the global IP address. A DDNS server 2601 used by the user of the user residence 1 is connected to the internet 3.

Figure 27:
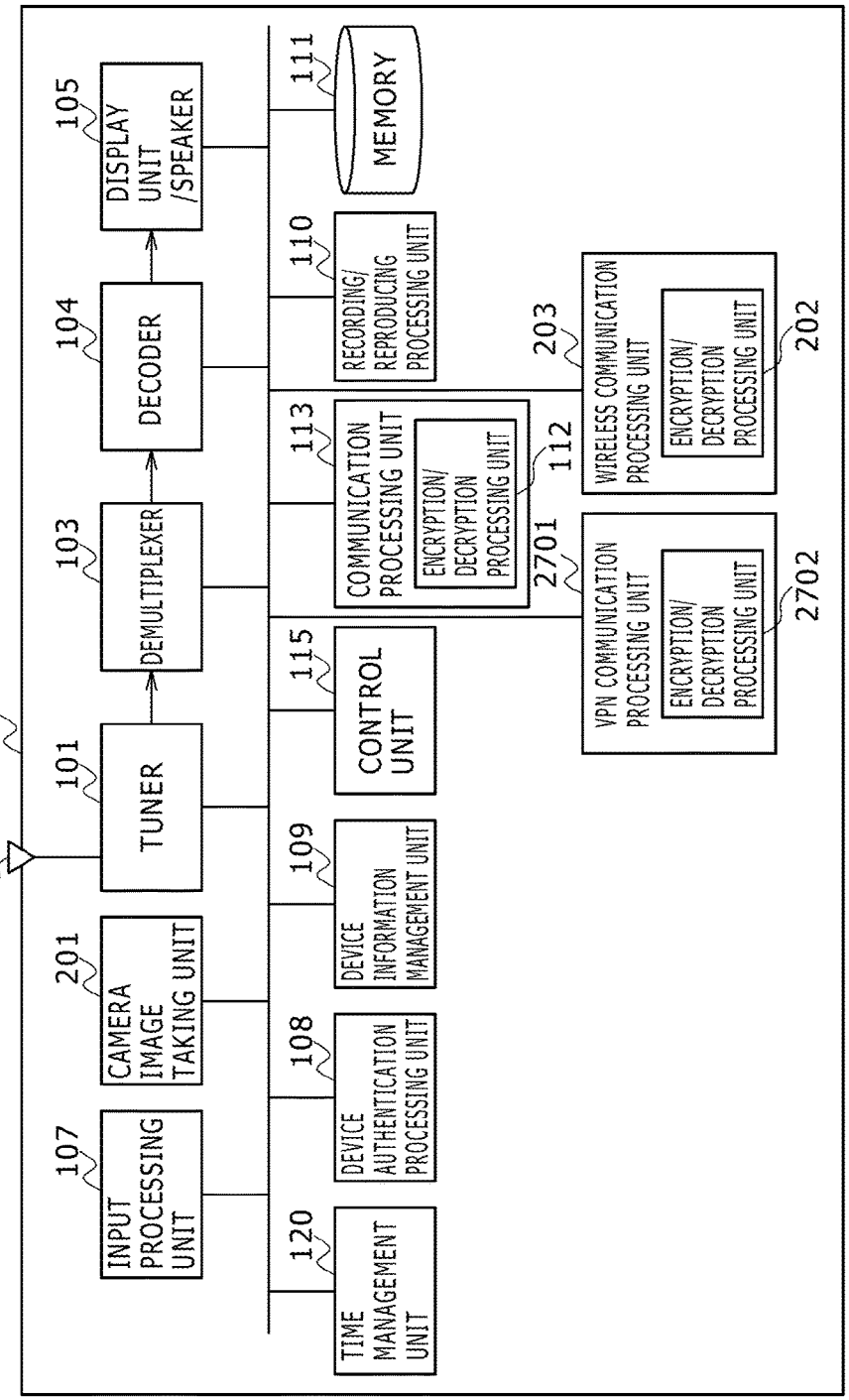
FIG. 27 is an explanatory view showing a configuration example of a portable terminal (content reception device).

FIG. 27 shows a configuration example of the portable terminal (content reception device) 2610 used in the embodiment.

The portable terminal 2610 is configured by the tuner 101, the demultiplexer 103, the decoder 104, the display unit/speaker 105, the input processing unit 107, the device authentication processing unit 108, the device information management unit 109, the recording/reproducing processing unit 110, the memory 111, the time management unit 120, the camera image taking unit 201, the communication processing unit 113, a wireless communication processing unit 203, the VPN communication processing unit 2701, and the control unit 115.

The communication processing unit 113 is a portion of transmitting/receiving contents or control commands to/from other device via the wireless communication processing unit 203 via the wireless access point 23. The communication processing unit 113 includes the encryption/decryption processing unit 112, and encrypts/decrypts transmitting/receiving contents in conformity with a prescribed protocol (for example, DTCP-IP or Marlin, etc.) which the content provision origins 5a, 5b define/operate.

The VPN communication processing unit 2701 is a portion of establishing a secure tunnel (tunnel) with the VPN corresponding router 2600 of the user residence 1. The secure connection is established on the internet 3 in order to safely execute transmission/reception between, for example, the communication processing unit 113 of the portable terminal 2610 of the going out destination 2" and the communication processing unit 113 of the content transmission device 100 at the user residence 1" without altering contents or control commands. The VPN communication processing unit 2701 includes an encryption/decryption processing unit 2702, executes authentication with the VPN corresponding router 2600 in conformity with a VPN protocol used (for example, IPsec, PPTP, etc.), and encrypts/decrypts the contents (for example, contents encrypted by DTCP-IP or control commands (for example, authentication information of DTCP-IP).

The wireless communication processing unit 203 is a portion of transmitting/receiving frames to/from the wireless access point 23 or other AV device connected by a wireless network. For example, there is IEEE802.11a/b/g/n or 3G. The wireless communication processing unit 203 includes an encryption/decryption processing unit 202, and encrypts/decrypts a packet transmitted/received by the VPN communication processing unit 2701 as necessary.

The other portions are similar to those of portable terminal 200 described in the first embodiment.

FIG. 28 shows an example of an extra-residential access device registration processing sequence executed between the content transmission device 100 at inside of the user residence 1 and the portable terminal (content reception device) 2610 present in the system configuration shown in FIG. 26. In FIG. 28, the portable terminal (content reception device) 2610 becomes an extra-residential access device.

It is necessary for executing the procedure to execute beforehand a setting processing (S2801) for using a DDNS function, and a setting processing (S2802) for using a VPN server function at the VPN corresponding router 2600.

In the setting processing of the DDNS function, information of a DDNS server 2601 used, a domain name, a user name, and a password registered to the DDNS server 2601, a global IP address, an updating period of the global IP address allocated from ISP are set.

In the setting processing of the VPN server function, a kind of a VPN protocol used or an authentication system is set.

Assume that the portable terminal (content reception device) 2610 is present at inside of the user residence 1 in executing the procedure. The content transmission device 100 and the portable terminal 2610 monitor TTL of a received packet, and prevent an access to the user residence 1 from outside by abandoning a packet set with a value of TTL exceeding the intra-residential restriction TTL value 1911 of the TTL table 1910 shown in FIG. 19. For that purpose, the content transmission device 100 and the portable terminal 2610 set TTL of a transmitted packet to be equal to or less than the intra-residential restriction TTL value 1911 of the TTL table 1910.

First, when a user connects the content transmission device 100 to a network at inside of the user residence 1, the control unit 115 of the content transmission device 100 acquires a private IP address from the VPN corresponding router 2600, thereafter, transmits a network participation notice to all of devices (the VPN corresponding router 2600, the portable terminal 2610, the content reception device 300) in FIG. 26 on the network (S2803).

When the control unit 115 of the portable terminal 2610 receives the network participation notice from the content transmission device 100 via the wireless communication processing unit 203 and the communication processing unit 113, the control unit 115 of the portable terminal 2620 issues a device information acquiring request to the content transmission device 100 (S2804). In correspondence therewith, the control unit 115 of the content transmission device 100 returns device information including a device kind of its own (for example, media server, media client), and a function of its own (for example, a content delivery function, a remote access function, an MOVE function) to the portable terminal 2610 (S2805).

The control unit 115 of the portable terminal 2610 acquiring the device information of the content transmission device 100 confirms whether information indicating whether the content transmission device 100 supports the remote access function is included in the device information. In a case where the content transmission device 100 does not support the remote access function, the control unit 115 does not execute processings thereafter. In a case where the content transmission device 100 supports the remote access function, the control unit 115 of the portable terminal 2610 determines whether the own device is registered to the content transmission device 100 by an instruction of a user or the own device per se (S2806).

In a case where it is determined that the portable terminal 2610 is registered to the content transmission device 100, the extra-residential access device registration processing (S700) explained in reference to FIG. 7 is executed between the device authentication processing unit 108 of the portable terminal 2610 and the device authentication processing unit 108 of the content transmission device 100.

When the VPN corresponding router 2600 receives the network participation notice from the control unit 115 of the content transmission device 100 at S2803, the VPN corresponding router 2600 transmits the device information acquisition request to the content transmission device 100 similar to S2804 of the portable terminal 2610 (S2807). The VPN corresponding router 2600 receives device information concerning the content transmission device 100 from the control unit 115 of the content transmission device 100 similar to S2805 (S2808). Timings of executing S2807 and S2808 are not limited to the timings, but S2807/S2808 may be executed prior to S2804/S2805, or in parallel therewith.

The control unit 115 of the content transmission device 100 registering the portable terminal 2610 to the device information management unit 109 as an extra-residential access device similar to first embodiment at S700 issues an information acquisition request concerning DDNS service to the VPN corresponding router 2600 via the communication processing unit 113 (S2809).

In correspondence therewith, the VPN corresponding router 2600 transmits information including URL (for example, http://AAA.BBB/) registered to the DDNS server 2601 set beforehand at S2801 and the port number to the content transmission device 100 (S2810).

The control unit 115 of the content transmission device 100 confirms whether URL of the own device has already been registered in reference to information acquired at S2810. In a case where URL of the own device has not been registered, the control unit 115 of the content transmission device 100 creates/holds URL (for example, http://AAA.BBB/CCC) for accessing to the own device from outside of the residence by using information acquired at S2810, and issues a request for setting information including the URL and the port number used to the VPN corresponding router 2600 (S2811).

In correspondence therewith, the VPN corresponding router 2600 registers the URL and the device information acquired at S2807 in relation to each other and notifies the registration (S2812).

Here, the control unit 115 of the content transmission device 100 may not execute S2811/S2812 in a case of using the URL information acquired from the VPN corresponding router 2600 as it is at S2809/S2810. The URL created at S2811 may be a description in accordance with a prescribed rule, for example, <URL acquired from the VPN corresponding router 2600>/<ID of the content transmission device 100>.

There may be used a method in which the VPN corresponding router 2600 creates URL for the content transmission device 100 after S2807/S2808, and sets the URL to the content transmission device 100 in place of S2809 through S2812.

The control unit 115 of the content transmission device 100 holding URL information at S2811/S2812 described above transmits information of whether the own device is opened (displayed) to an extra access device or a request for setting remote access restriction information including folder information opened to the public to the VPN corresponding router 2600 (S2813). In correspondence therewith, the VPN corresponding router 2600 registers the remote access restriction information in relation to the device information acquired at S2807, or URL acquired at S2809, and notifies the registration (S2814).

On the other hand, the control unit 115 of the portable terminal 2610 transmits a request for acquiring information of URL or the port number for accessing to the content transmission device 100 from outside of the residence to the control unit 115 of the content transmission device 100 when the registration of the own device to the device information management unit 109 of the content transmission device 100 is succeeded at S700 (S2815).

In correspondence therewith, the control unit 115 of the content transmission device 100 transmits URL held at S2811 (URL created by the own device or URL allocated from the VPN corresponding router 2600) and the port number used to the VPN corresponding router 2600 (S2816).

Here, the control unit 115 of the content transmission device 100 may notify the URL and the port number to the control unit 115 of the portable terminal 2610 after succeeding S700 in place of S2815/S2816 described above.

FIG. 29 shows an example of a processing sequence in a case where the portable terminal 2610 executing the device registration to the content transmission device 100 by using the device registration processing procedure 52800 shown in FIG. 28 is taken out to outside of the residence, and a broadcasting program inputted from the going out destination 2 to the content transmission device 100 via the tuner 101 or contents stored to the recording unit 111 are seen and heard with the system configuration shown in FIG. 26.

Prior to the processing procedure, the portable terminal 2610 sets to use a VPN client function for establishing secure tunneling with the VPN corresponding router 2600 previously at the user residence 1 or the going out destination 2 (S2901). Specifically, the new URL or the port number acquired at 52800 shown in FIG. 28 is registered to the VPN communication processing unit 2701 by an instruction of the user or the control unit 115 of the portable terminal 2610. The portable terminal 2610 registers a user name or a password registered to the DDNS server 2601 by using the input processing unit 107 to the VPN communication processing unit 2701.

When the user instructs to see and hear contents by using the input processing unit 107 of the portable terminal 261 at the going out destination 2, the control unit 115 of the portable terminal 2610 displays the content transmission device list on the display unit/speaker 105. The content transmission device list displays the content transmission device 100 which is a device registered to the extra-residential access information table 60000 held by the device information management unit 109.

Next, when the user selects the content transmission device 100 from the list of content transmission devices by using the input processing unit 107, the control unit 115 of the portable terminal 2610 refers to URL of the content transmission device 100 registered to the extra-residential access information table 60000, and transmits a request for acquiring the global IP address indicated by the URL to the DDNS server 2601 from the wireless access point 23, and the router 22 of the going out destination 2 via the wireless communication processing unit 203 via the internet 3 (S2902). In correspondence therewith, the DDNS server 2601 confirms whether URL is registered, and transmits the global IP address to the portable terminal 2610 in a case of the registration (S2903). Here, the portable terminal 2610 may not display the list of content transmission devices, but the user may input URL of the content transmission device 100 via the input processing unit 107 or may designate URL attached with a bookmark, and the content reception device 200 may access to the content transmission device 100 based on the inputted information.

The control unit 115 of the portable terminal 2610 acquiring the global IP address allocated to the VPN corresponding router 2600 of the user residence 1 instructs to establish a secure channel with the VPN corresponding router 2600. The VPN communication processing unit 2701 establishes VPN connection with the VPN corresponding router 2600 indicated by the global IP address by using the user name/password registered to the VPN communication processing unit by the VPN client setting in accordance with the VPN protocol used and notifies the result to the control unit 115 (S2904). After establishing the VPN connection, information exchanged between the portable terminal 2610 and the VPN corresponding router 2600 is safely protected by an encryption. That is, in a case where the portable terminal 2610 transmits information of control data or contents to the content transmission device 100 via the VPN corresponding router 2600, the information is encrypted by the encryption/decryption processing unit 2702 of the VPN communication processing unit 2701, and transmitted onto the communication channel established at S2904 via the wireless communication processing unit 203.

The VPN corresponding router 2600 receiving the encrypted information decodes the information, thereafter, executes routing to the content transmission device 100. In a case where the content transmission device 100 transmits information of control data or contents to the portable terminal 2610 via the VPN corresponding router 2600, the content transmission device 100 transmits the information of control data or contents to the VPN corresponding router 2600 via the communication processing unit 113. The VPN corresponding router 2600 encrypts the information to transmit onto the communication channel established at S2904. The VPN communication processing unit 2701 of the portable terminal 2610 receiving the encrypted information via the wireless communication processing unit 203 decodes the information at the encryption/decryption processing unit 2702 to deliver to the communication processing unit 113.

The portable terminal 2610 can use the private IP address (192.168.10.6 in FIG. 29) used at the user residence 1 for communicating with the content transmission device 100 as it is.

The control unit 115 of the portable terminal 2610 issues a request for acquiring information of a device connected to the user residence 1 to the VPN corresponding router 2600 on the secure communication channel established at S2904 (S2905). In correspondence therewith, the VPN corresponding router 2600 transmits connection device information in the user residence 1 held by its own (content transmission device 100, content reception device 300 in FIG. 26) to the portable terminal 2610 (S2906). Similarly, the VPN corresponding router 2600 issues a request for acquiring device information held by the portable terminal 2610 to the portable terminal 2610 (S2907). In correspondence therewith, the control unit 115 of the portable terminal 2610 transmits the device information of its own to the VPN corresponding router 2600 (S2908). Here, a processing order of S2905/S2906, S2907/S2908 is not limited thereto.

The VPN corresponding router 2600 acquiring the device information of the portable terminal 2610 at the going out destination 2 at S2906 transmits a network participation notice of the portable terminal 2610 to the content transmission device 100 at inside of the user residence 1 (S2909). The participation notice may be broadcast to all of connection devices (content transmission device 100, content reception device 300) at inside of the user residence 1.

The control unit 115 of the content transmission device 100 receiving the network participation notice of the portable terminal 2610 (actually notified by the VPN corresponding router 2600 as a deputy) issues a request for acquiring device information concerning the portable terminal 2610 (S2910). The VPN corresponding router 2600 receiving the request for acquiring the device information transmits the device information of the portable terminal 2610 acquired at S2908 to the content transmission device 100 as the deputy of the portable terminal 2610 (S2911). Thereby, the control unit 115 of the content transmission device 100 can recognize that the portable terminal 2610 at the going out destination 2 is connected, and is brought into a communicatable state within a range of the private IP address used at the user residence 1.

Here, the control unit 115 of the content transmission device 100 needs to determine whether the portable terminal 2610 makes access from inside of the residence, or makes access from outside of the residence in order not to output a live broadcasting program or contents remote access of which is restricted by the content provision origins 5a, 5b to outside of the residence as shown in S1502 of FIG. 15 and S1702 of FIG. 17. According to the embodiment, the IP address of the portable terminal 2610 accessed from the going out destination 2 is within the range of the private IP address used at the user residence 1, and therefore, the content transmission device 100 cannot determine inside of the residence or outside of the residence by a value of the IP address.

Hence, the control unit 115 of the content transmission device 100 determines whether the portable terminal 2610 makes access from inside of the residence or makes access from outside of the residence by using any method of (1) a method of adding information indicating that the portable terminal 2610 makes access from outside of the residence in the network participation notice issued by the VPN corresponding router 2600 at S2909 described above, (2) a method of regarding that all of the network participation notices issued by the VPN corresponding router 2600 are accesses from outside of the residence, and (3) a method of adding information indicating that the portable terminal 2610 makes access from outside of the residence in the device information response returned by the VPN corresponding router 2600 at S2911 described above.

The control unit 115 of the portable terminal 2610 confirming that the portable terminal 2610 is brought into a communicatable state with the content transmission device 100 at inside of the user residence 1 at S2908 described above transmits a request for acquiring content information to the content transmission device 100 (S2912).

The control unit 115 of the content transmission device 100 creates contents list information (for example, title, date, copy control information, recording time) concerning a portion or all of contents stored to the recording unit 111 except a live broadcasting program or IP delivery contents which the own device is receiving by the tuner 101 in view of the fact that the portable terminal 2610 which is a request origin makes access from outside of the residence by using the procedure of creating content list information shown in FIG. 17 (S2913) to transmit to the content reception device 200 (S2914).

The control unit 115 of the portable terminal 2610 displays received content information on the display unit/speaker 105 as a list of contents. When the user designates contents intended to see and hear from the list of contents via the input processing unit 107 (S2915), the device authentication processing unit 108 of the portable terminal 2610 executes the extra-residential access device authentication processing S1100 with the device authentication processing unit 108 of the content transmission device 100.

In a case where the extra-residential access device authentication processing is succeeded, and an extra-residential exchange key necessary for encrypting/decrypting contents can be shared between the device authentication processing unit 108 of the portable terminal 2610 and the device authentication processing unit 108 of the content transmission device 100, the control unit 115 of the portable terminal 2610 transmits a request for seeing and hearing desired contents to the content transmission device 100 (S2916). At that occasion, the request for seeing and hearing contents may be added with ID for identifying the extra-residential exchange key received at the extra-residential access device authentication processing S1100.

The control unit 115 of the content transmission device 100 transmits contents encrypted by the encryption/decryption processing unit 112 to the portable terminal 2610 via the VPN corresponding router 2600 by using the key shared at S1100 in correspondence with the request for seeing and hearing contents (S2917). In a case where the value of the extra-residential simultaneous access number 5322 reaches the extra-residential simultaneous access maximum number 5106 by using the extra-residential device information table 5300 shown in FIG. 5, a response rejecting the request for seeing and hearing contents can also be returned. The VPN corresponding router 2600 subjects the encrypted contents further to an encryption for the VPN connection, and pertinently adds the header information or information for error check to transmit to a secure channel established at S2904 described above.

The VPN communication processing unit 2701 of the portable terminal 2610 decrypts the encryption executed by the VPN corresponding router 2600 by using the encryption/decryption processing unit 2702 concerning encrypted contents received via the wireless communication processing unit 203 to deliver to the communication processing unit 113. The device authentication processing unit 108 of the portable terminal 2610 creates a common key for decrypting contents by using the extra-residential exchange key shared at S1100, and sets the common key to the encryption/decryption processing unit 112. The VPN communication processing unit 2701 of the portable terminal 2610 decrypts the encrypted contents outputted from the VPN communication processing unit 2701 by the encryption/decryption processing unit 112. The VPN communication processing unit 2701 of the portable terminal 2610 outputs the decrypted contents to the display unit/speaker 105 while decoding by the decoder 104.

As described above, according to the embodiment, contents can safely be used by remote access by establishing the secure tunnel (VPN connection) on the internet 3 at outside of the residence and inside of the residence, and thereafter exchanging contents and control commands. The content provision origin can restrict use by remote access to contents delivered thereby by identifying whether an access is made from either of outside of residence/inside of residence even in a mode in which a remote access device accessing from outside of the residence uses the private IP address.

Incidentally, the present invention is not limited to the embodiments described above but includes various modification examples. For example, the embodiments described above have been explained in details in order to explain to easy to understand the present invention, and are not necessarily limited to what includes all of configurations explained. A portion of a configuration of a certain embodiment can be replaced by a configuration of other embodiment, and further the configuration of the other embodiment can be added to the configuration of the certain embodiment. Portions of configurations of respective embodiments may be subjected to addition, deletion, or replacement of other configuration.

Portions or all of respective configurations, functions, processing units, processing means described above may be realized by a hardware by designing by, for example, an integrated circuit. Respective configurations or functions may be realized by software by interpreting and executing a program realizing the respective functions by a processor. Information of programs, tables, or files realizing the respective functions may be stored in a recording device of memory, hard disk, SSD (Solid State Drive), or record media of IC card, SD card, DVD.

Control lines and information lines which are conceived to be necessary for explanation are shown and all of control lines and information lines are not necessarily shown in view of a product. Actually, it may be considered that almost all of configurations are connected to each other.

LIST OF REFERENCE SIGNS

1 user residence 1, 2 going out destination 2, 3 internet, 4 other user residence, 5 content provision origin, 100 content transmission device, 200, 300, 400 content reception devices, 500, 600, 700, 800 content transmission and reception devices, 107 input processing unit, 108 device authentication processing unit, 109 device information management unit, 110 recording/reproducing processing unit, 111 recording unit, 112 encryption/decryption processing unit, 113 communication processing unit, 115 control unit, 202 wireless encryption/decryption processing unit, 203 wireless communication processing unit, 1091 timer, 1092 device information updating unit, 1093 device information storing unit, 5100 definition table, 5200 intra-residential device information table, 5300 extra-residential device information table, 1200 content using descriptor, 1300 digital copy control descriptor, 1400 digital content output control table, 1900 threshold information, 2100 packet monitoring table, 2300 connection management table, 2500 digital content recording control table, 60000 extra-residential access information table, 2600 VPN corresponding router, and 2701 VPN communication processing unit.

The invention claimed is:

1. A content transmission device for transmitting a digital content to other device connected to a network, comprising: a communication processor that transmits digital content which accompanies a remote access restriction information for restricting transmission of the digital content from the content transmission device to a device at outside of an intra-residential network which is connected the content transmission device and a digital copy control information indicating conditions for copy of the digital content, to the other device; a controller that determines whether the other device is present at the intra-residential network which is connected to the content transmission device;
a receiver that receives the digital content; a memory that records the digital content received by the receiver; and a timer that measures a time period until an elapse of a prescribed time period after the memory has recorded the digital content,
wherein the controller controls the communication processor, wherein the controller that determines whether or not the other device is present at the intra-residential network in a case where the remote access restriction information accompanied with the digital content indicates that transmission of the digital content from the content transmission device to a device at outside of an intra-residential network is not permitted, wherein the controller prevents the communication processor from transmitting the digital content to the other device in a case where the other device is not present at the intra-residential network as a result of the determination, and wherein the controller performs setting such that the digital copy control information indicates copy prohibition of the digital content, to prohibit copying, and permits the t communication processor to transmit the digital content to the other device in a case where the other device is present at the intra-residential network as a result of the determination,
wherein the controller permits recording the digital content to the memory in a case where the digital copy control information received by the receiver indicating conditions of accept a copy and the remote access restriction information received by the receiver does not accept a remote access; wherein the controller starts measuring the prescribed period by starting the timer in a case where the memory starts recording the digital content received by the receiver, and wherein the controller outputs the digital content to the other device from the communication processor in a case where the remote access restriction information accompanied with the digital content which is being recorded or recorded to the memory indicates that the remote access is accepted, the controller determines that the other device is not present at the intra-residential network, and the time period measured by the timer elapses for the prescribed time period.

2. The content transmission device according to claim 1, wherein the communication processor exchanges various data or commands to and from the other device, and wherein the controller transmits the content information which does not include information concerning the digital content which is being received by the receiver to the other device from the communication processor when the controller determines that the other device is not present at the intra-residential network in a case where the communication processor receives a request for acquiring the digital content which is being received by the receiver and the content information which is a list of the digital content which is being recorded or recorded to the memory from the other device.

3. The content transmission device according to claim 2, wherein the controller transmits the content information which does not include information concerning the digital content at which the time period measured by the timer does not reach the prescribed time period in the digital content which is being recorded or recorded to the memory to the other device from the communication processor in a case where the communication processor receives the request for acquiring the content information from the other device, and the controller determines that the other device is not present at the intra-residential network.

4. A content transmission method of a content transmission device for transmitting a digital content to other device connected to a network, comprising:
determining whether the other device is present at an intra-residential network which is connected to the content transmission device in a case where the remote access restriction information for restricting the digital content from the content transmission device to a device at outside of an intra-residential network, accompanied with the digital content, does not accept a remote access; prohibiting output the digital content to the other device in a case where the other device is not present at the intra-residential network as a result of the determination; and setting a digital copy control information indicating conditions of restricting copy of the digital content, which is accompanied with the digital content, to prohibit copying, and permitting output the digital content to the other device, in a case where the other device is present at the intra-residential network as a result of the determination,
wherein the digital content which is accompanied with the digital copy control information indicating conditions of restricting copy of the digital content is received, wherein recording the digital content to the other device is prohibited in a case where the other device is not present at the intra-residential network as a result of the determination, and recording the digital content to a record media included in the content transmission device is permitted in a case where the digital copy control information of the received digital content indicating conditions of accept a copy, and in a case where the remote access restriction information does not accept a remote access, and wherein a time period is started to be measured when the received digital content is started to be recorded to the record media, and the digital content is outputted to the other device in a case where the remote access restriction information accompanied with the digital content which is being recorded or recorded to the record media indicates that the remote access is accepted, the other device is determined not to be present at the intra-residential network, and the measured time period exceeds a prescribed time period.

5. The content transmission method according to claim 4, wherein the content information which does not include information concerning the digital content which is being received is transmitted to the other device when the other device is not present at the intra-residential network in a case where a request for acquiring the digital content which is being received and the content information which is a list of the digital content which is being recorded or recorded to the record media from the other device.

6. The content transmission method according to claim 5, wherein the content information which does not include information concerning the digital content in which the measured time period does not reach the prescribed time period in the digital content which is being recorded or recorded to the record media is transmitted to the other device when the other device is determined not to be present at the intra-residential network in a case where a request for acquiring the content information is received from the other device.

* * * * *